(12) United States Patent
Okutani et al.

(10) Patent No.: US 8,980,469 B2
(45) Date of Patent: Mar. 17, 2015

(54) PRISMATIC SECONDARY BATTERY

(71) Applicants: SANYO Electric Co., Ltd., Moriguchi-shi, Osaka (JP); Toyota Jidosha Kabushiki Kaisha, Toyota-shi, Aichi (JP)

(72) Inventors: Eiji Okutani, Kasai (JP); Yoshinori Yokoyama, Kasai (JP); Yasuhiro Yamauchi, Kasai (JP); Toshiyuki Nohma, Kobe (JP); Hironori Harada, Nukata-gun (JP); Toshihiro Takada, Nagoya (JP); Hiroshi Inukai, Toyota (JP); Akira Kiyama, Toyota (JP); Ryuta Morishima, Toyota (JP)

(73) Assignees: SANYO Electric Co., Ltd., Daito-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 50 days.

(21) Appl. No.: 13/750,616

(22) Filed: Jan. 25, 2013

(65) Prior Publication Data

US 2013/0196220 A1 Aug. 1, 2013

(30) Foreign Application Priority Data

Jan. 27, 2012 (JP) .................. 2012-014986
Jul. 27, 2012 (JP) .................. 2012-166925

(51) Int. Cl.
*H01M 2/00* (2006.01)
*H01M 2/02* (2006.01)
*H01M 2/08* (2006.01)
*H01M 2/12* (2006.01)
*H01M 2/34* (2006.01)

(52) U.S. Cl.
CPC .............. *H01M 2/0217* (2013.01); *H01M 2/34* (2013.01)

USPC ............... 429/181; 429/53; 429/56; 429/57; 429/185; 429/186

(58) Field of Classification Search
USPC .......... 429/53–56, 61–64, 96–100, 163–187, 429/50–52; 29/623.1–623.5
See application file for complete search history.

(56) References Cited

U.S. PATENT DOCUMENTS 4,943,497 A * 7/1990 Oishi et al. .................. 429/53
5,705,290 A 1/1998 Azema
(Continued)

FOREIGN PATENT DOCUMENTS

JP 08-171898 A 7/1996
JP 08-293301 A 11/1996
(Continued)

*Primary Examiner* — Basia Ridley
*Assistant Examiner* — Caitlin Wilmot
(74) *Attorney, Agent, or Firm* — Westerman, Hattori, Daniels & Adrian, LLP

(57) ABSTRACT

A high-reliability prismatic secondary battery with a current interruption mechanism that is unlikely to be damaged even if the battery is subjected to shock is provided. The prismatic secondary battery includes a second insulating member having a first through-hole, the second insulating member being arranged between a first region of a positive electrode collector and an inversion plate. The first region of the positive electrode collector and the inversion plate are electrically connected to each other through the first through-hole. The second insulating member has a plurality of fixing pawl portions. The fixing pawl portions are hooked and fixed to a fixing portion formed on the outer surface side of the conductive member.

14 Claims, 15 Drawing Sheets

(56) References Cited

U.S. PATENT DOCUMENTS

| | | |
|---|---|---|
| 5,766,790 A | 6/1998 | Kameishi et al. |
| 5,985,478 A | 11/1999 | Kim |
| 6,228,523 B1 | 5/2001 | Azema |
| 6,248,470 B1 | 6/2001 | Azema et al. |
| 2008/0038627 A1 | 2/2008 | Yamauchi et al. |
| 2008/0038628 A1 | 2/2008 | Yamauchi et al. |
| 2010/0233529 A1 | 9/2010 | Nansaka et al. |

FOREIGN PATENT DOCUMENTS

| | | |
|---|---|---|
| JP | 09-055197 A | 2/1997 |
| JP | 11-120979 A | 4/1999 |
| JP | 11-154504 A | 6/1999 |
| JP | 11-307080 A | 11/1999 |
| JP | 11-329405 A | 11/1999 |
| JP | 2008-66254 A | 3/2008 |
| JP | 2008-66255 A | 3/2008 |
| JP | 2010-212034 A | 9/2010 |

* cited by examiner

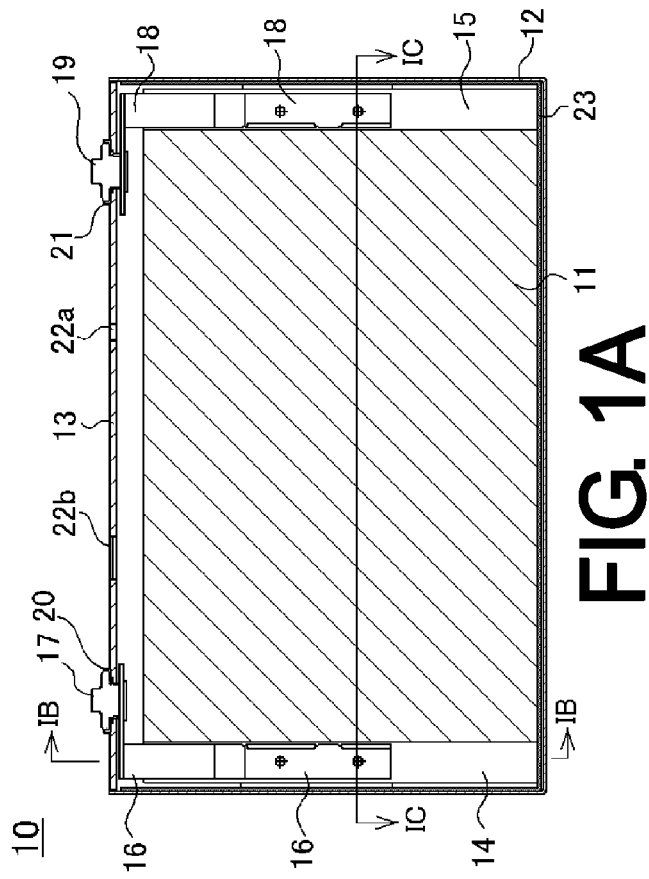
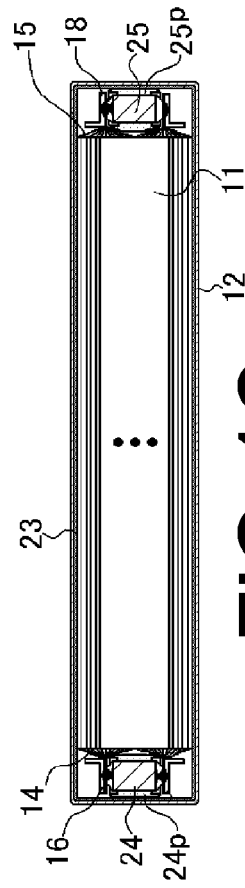
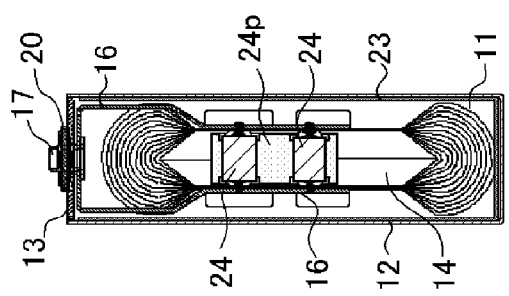

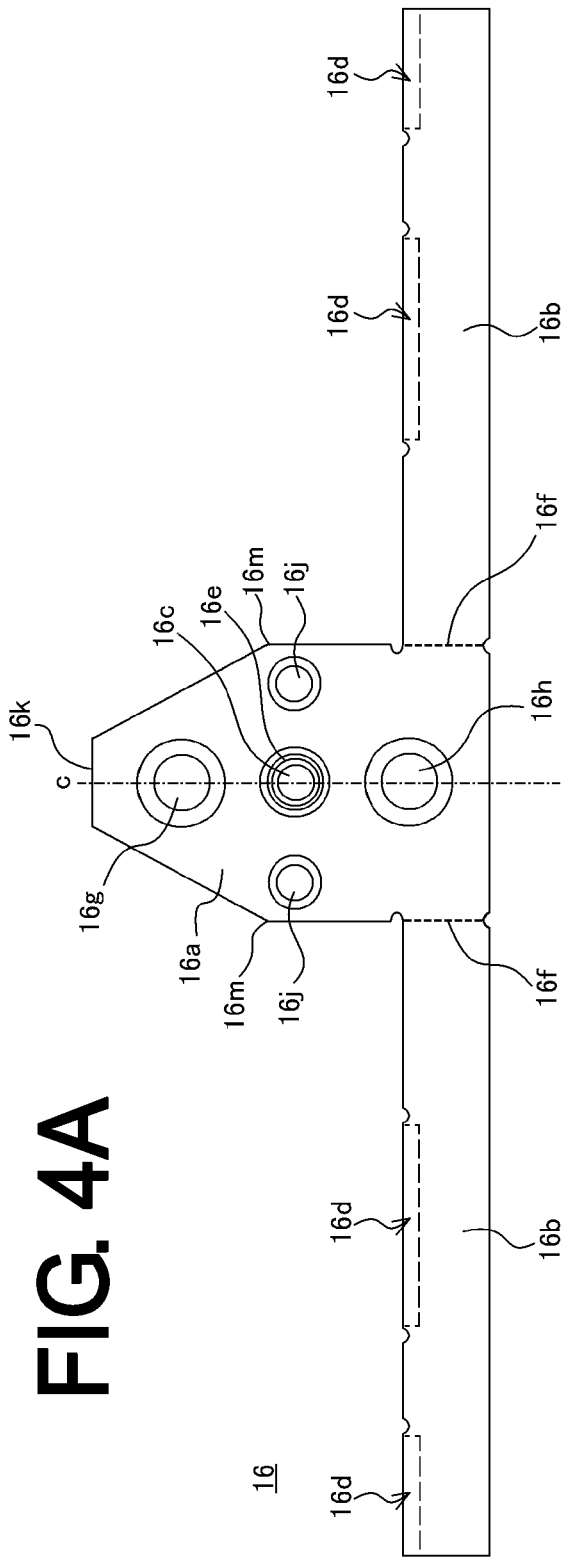
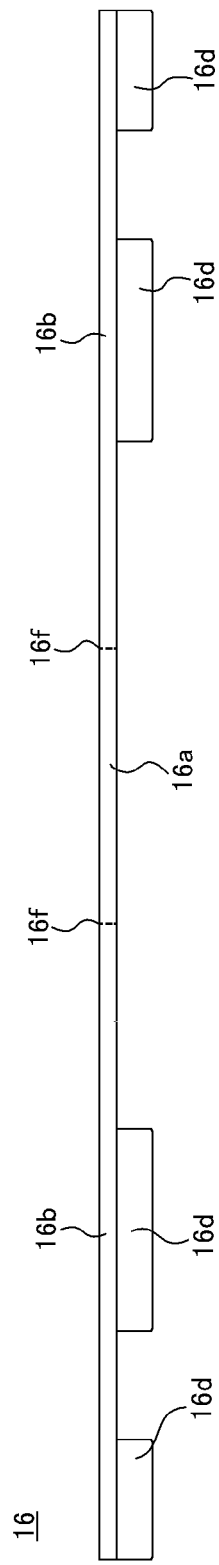
FIG. 4A
FIG. 4B

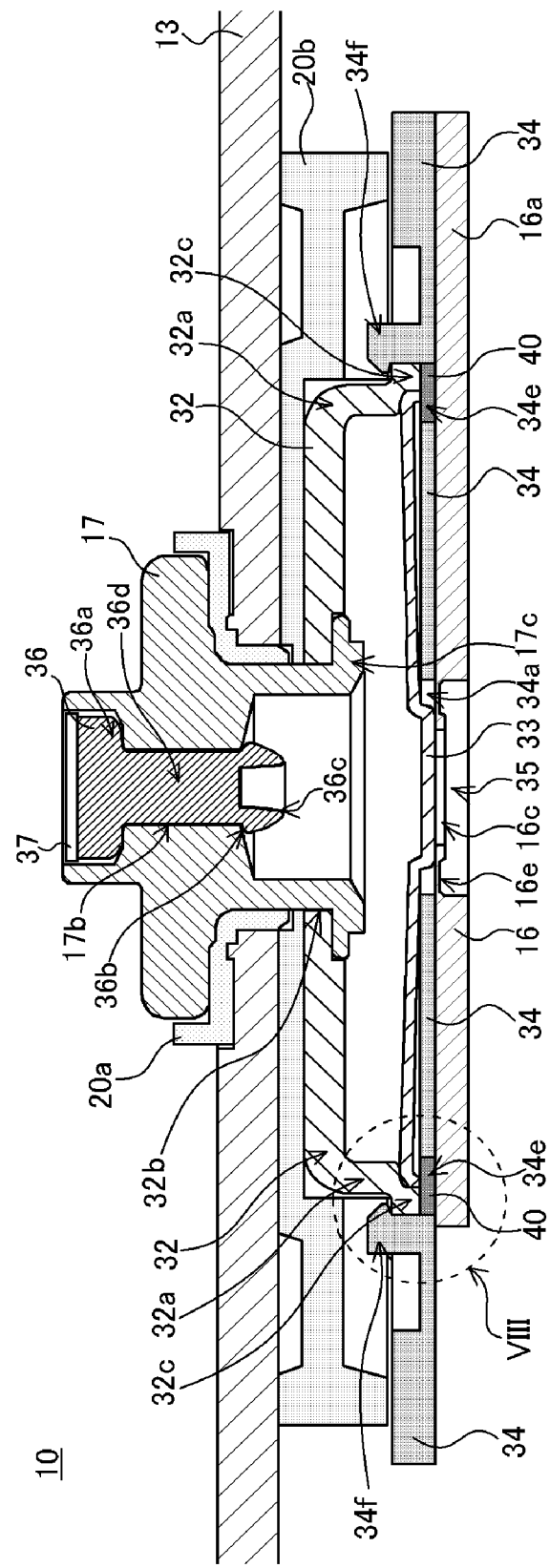

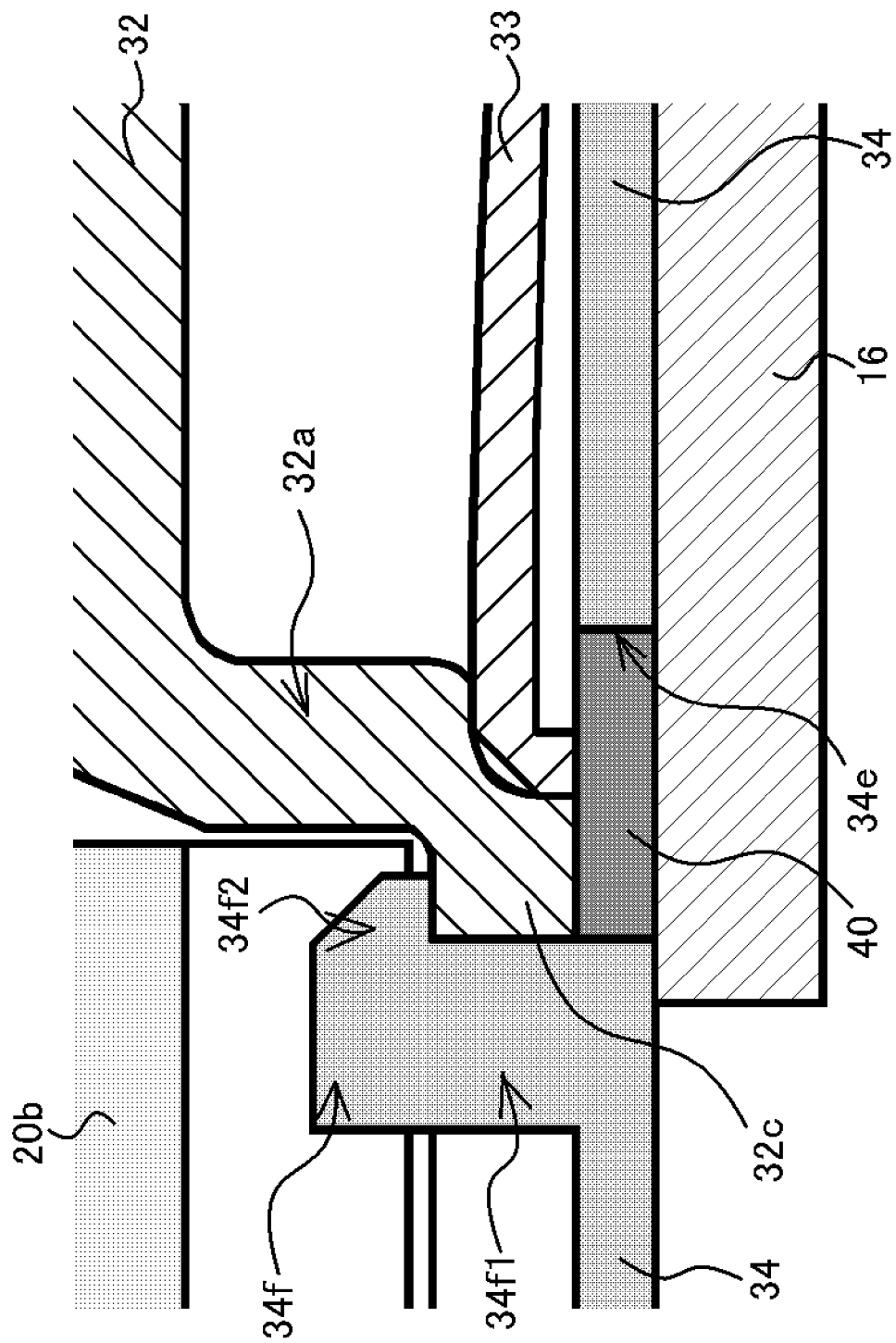

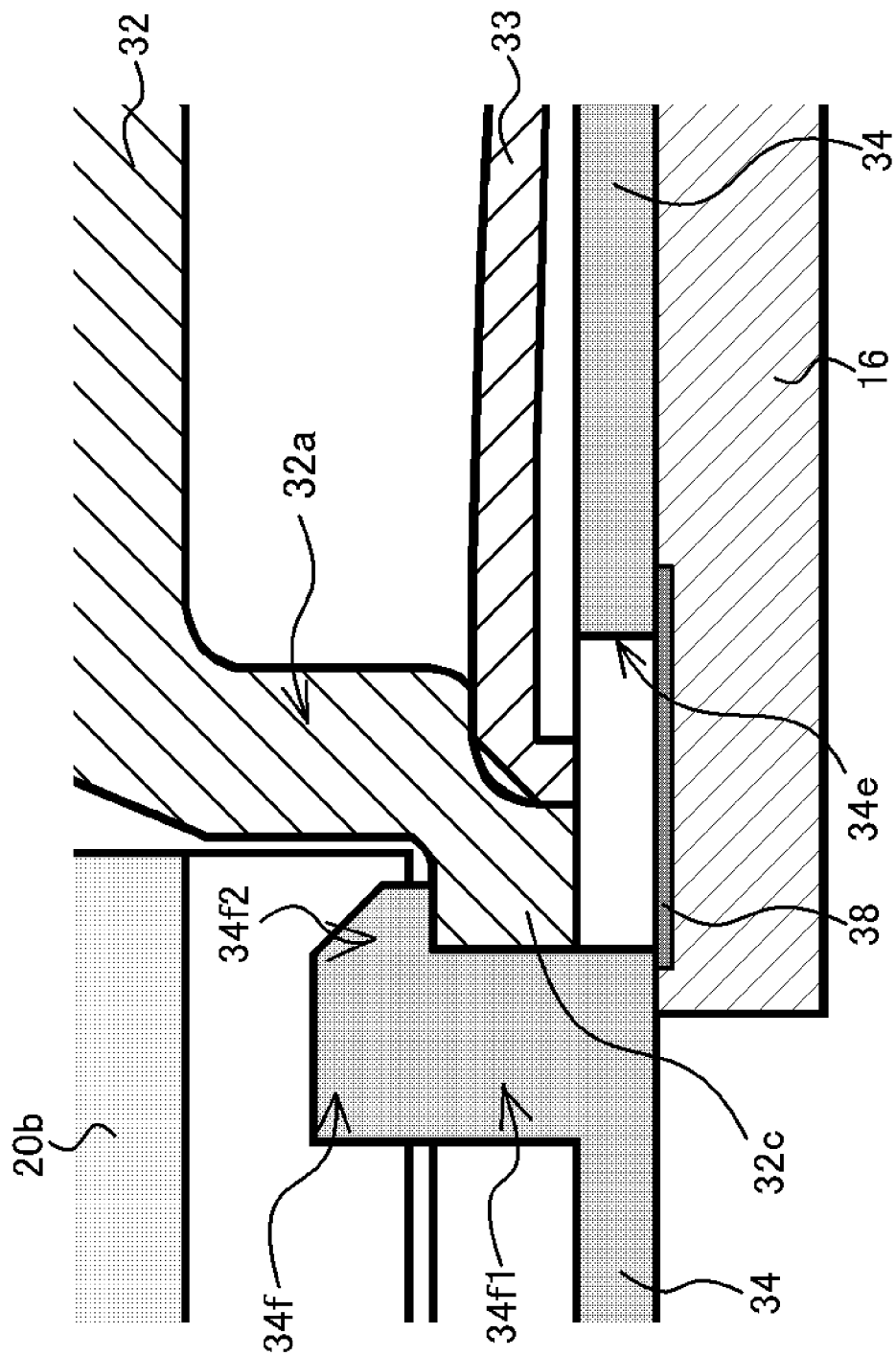

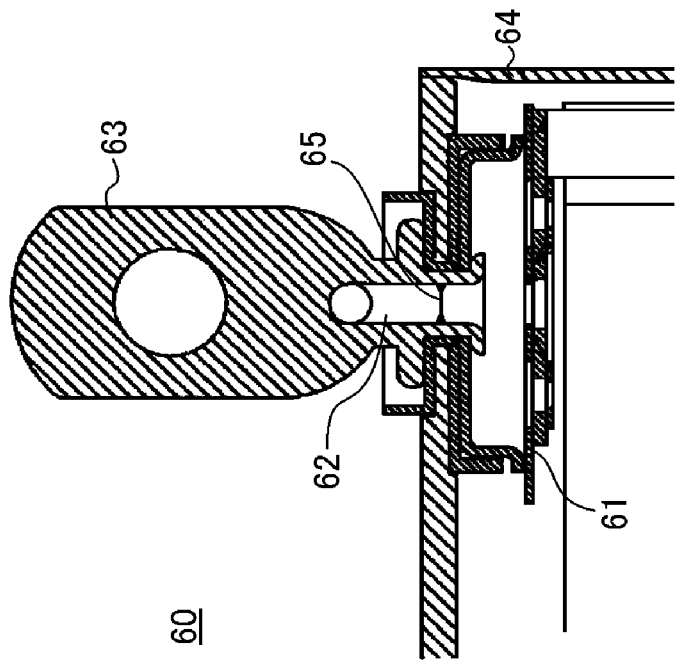
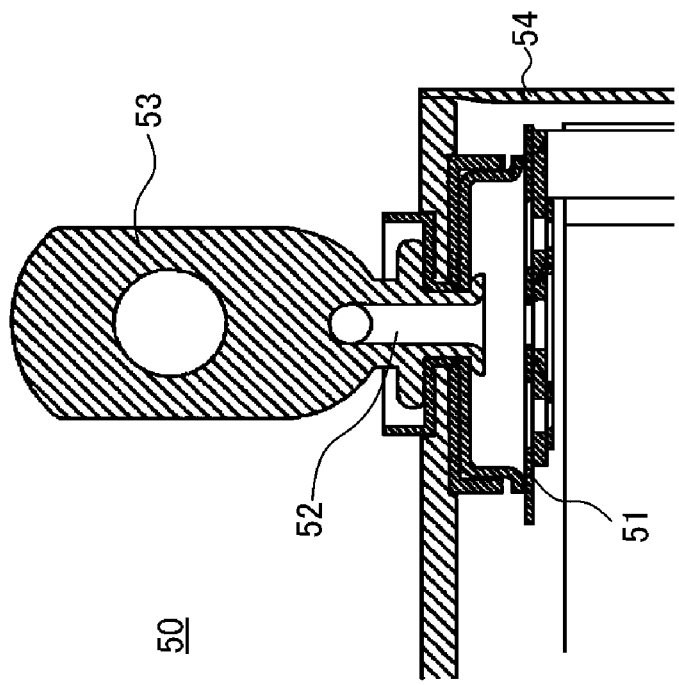

PRISMATIC SECONDARY BATTERY

TECHNICAL FIELD

The present invention relates to a prismatic secondary battery, such as a nonaqueous electrolyte secondary battery or nickel-hydrogen secondary battery, that internally includes a current interruption mechanism.

BACKGROUND ART

As the drive power sources for portable electronic equipment such as mobile telephones (including smartphones), portable computers, PDAs, and portable music players, much use is made of alkaline secondary batteries and nonaqueous electrolyte secondary batteries, typified by nickel-hydrogen batteries and lithium ion batteries, respectively. Furthermore, alkaline secondary batteries and nonaqueous electrolyte secondary batteries are also much used as drive power sources for electric vehicles (EVs) and hybrid electric vehicles (HEVs, PHEVs), and in stationary storage battery systems in applications for curbing output variation of photovoltaic power generation and wind power generation, etc., in grid power peak load shifting applications for storing power at night and using it in the daytime, and in other applications. Particularly in EV, HEV and PHEV applications or stationary storage battery systems, high capacity and high output characteristics are required. Individual batteries accordingly get larger and are used connected in series or in parallel. Prismatic secondary batteries are widely used in such cases, because of their space efficiency.

Materials extremely rich in reactivity are used for the batteries in such applications, and particularly for nonaqueous electrolyte secondary batteries. Consequently, such batteries are required to have much higher safety than the secondary batteries used for small-sized portable equipment. Therefore, prismatic secondary batteries that are used for applications of the foregoing kinds are provided not only with a gas escape valve for releasing the battery outer casing internal pressure when it increases, but also with a current interruption mechanism for breaking the electrical connection between the external terminals and the electrode assembly inside the outer casing—as set forth, for example, in JP-A-2008-66254, JP-A-2008-66255 and JP-A-2010-212034.

For example, JP-A-2008-66254 discloses the invention of a prismatic secondary battery 50 that, as shown in FIG. 14A, includes an external terminal 53 having a through-hole 52 putting a current interruption mechanism 51 in communication with the space exterior to the prismatic secondary battery 50, and is so configured that the current interruption mechanism 51 is reliably actuated when the pressure inside the outer casing 54 increases. Furthermore, JP-A-2008-66255 discloses the invention of a prismatic secondary battery 60 that, as shown in FIG. 14B, includes an external terminal 63 having a through-hole 62 putting a current interruption mechanism 61 in communication with the space exterior to the prismatic secondary battery 60, and is so configured that the current interruption mechanism 61 is actuated when the pressure inside the outer casing 64 increases, and configured that the through-hole 62 is sealed by a membrane plug 65 of resin, in order to prevent moisture or oxygen from entering the current interruption mechanism 61 through the through-hole 62 and causing deterioration of the current interruption mechanism 61.

In the prismatic secondary batteries disclosed in JP-A-2008-66254 and JP-A-2008-66255, the through-hole is provided so that the battery exterior is in communication with the space in the current interruption mechanism that corresponds to the outside of the battery, and hence that the current interruption mechanism will be readily actuated when the pressure inside the outer casing increases. However, even if the pressure inside the outer casing increases due to some cause, the pressure of the gas that is produced in the battery interior will be extremely high during the abnormality, and there will be no simultaneous similar increase in the pressure inside the sealed space in the current interruption mechanism that corresponds to the outside of the battery. This means that there will be no substantial difference in the actuation of the current interruption mechanism, whether the space in the current interruption mechanism that corresponds to the outside of the battery is sealed or open.

JP-A-2010-212034 therefore discloses a prismatic secondary battery 70 that, as shown in FIG. 15, has a sealing body 71 that seals the mouth of the outer casing (omitted from the drawing), and a connection terminal 72 that is installed to the sealing body 71, with the object of rendering it difficult for electrolyte or cleaning fluid to enter the inside of the current interruption mechanism during manufacture. In this prismatic secondary battery 70, a current interruption mechanism 74 that interrupts the current in response to an increase in the pressure inside the outer casing is provided between the connection terminal 72 and a collector 73 that electrically connects the connection terminal 72 to the electrode assembly (omitted from the drawing); the connection terminal 72 has a through-hole 75 formed in its interior, the through-hole 75 which communicates with the space in the current interruption mechanism 74 that corresponds to the outside of the battery; and the through-hole 75 is sealed by a terminal plug 76 formed of an elastic member, so that a sealed space is formed between the through-hole 75 and the current interruption mechanism 74.

This current interruption mechanism 74 includes an inversion plate 77 that performs the function of a valve body, and the thin portion 73a of the collector 73. An annular groove 73b is formed in the thin portion 73a of the collector 73, and the inversion plate 77 is welded to the central part of the thin portion 73a. Moreover, the edge portion 77a around the periphery of the inversion plate 77 is welded to the inner circumferences of a flange portion 78a formed at the bottom end of the tubular portion of a tab member 78. The connection terminal 72 is electrically insulated from the sealing body 71 with an upper first insulating member 79 and a lower first insulating member 80 interposed therebetween, and is electrically connected to the top end of the tubular portion of the tab member 78. A second insulating member 81 of resin is disposed between the collector 73 and the inversion plate 77 at the periphery of the current interruption mechanism 74, and this second insulating member 81 is fixed to and integrated with the lower first insulating member 80 by latching-fixing portions 81a. As a result, when the pressure inside the outer casing increases, the inversion plate 77 is deformed toward the sealing body 71, and then the thin portion 73a of the collector 73 is cut through at the groove 73b. The electrical connection between the collector 73 and the inversion plate 77 is thus broken. This has the effect of stopping any further charging or discharging of the battery.

The prismatic secondary battery disclosed in JP-A-2010-212034 has high safety because it includes a current interruption mechanism. Moreover, during manufacture, the nonaqueous electrolyte or cleaning fluid, etc., will be unlikely to enter the current interruption mechanism. Thus, this invention offers the excellent advantages of a prismatic nonaqueous electrolyte secondary battery that includes high-reliability connection terminals.

However, when the battery is subjected to shock due to vibration or being dropped, for example, the electrode assembly may be shifted resulting in a shock to the current interruption mechanism 74. As a result, the connecting portion between the collector 73 and the inversion plate 77 may fracture or become cracked. Furthermore, the welded portion between the inversion plate 77 and the flange portion 78a formed at the lower end side of the tubular portion of the tab member 78 may fracture or become cracked. When the components included in the current interruption mechanism 74 are broken in this way, the conductive pathway between the collector 73 and the connecting terminal 72 may be cut off, or the current interruption mechanism 74 may cease to operate normally. For example, if a fracture or a crack exists in the welded portion between the inversion plate 77 and the flange portion 78a, gas produced in the vicinity of the electrode assembly may enter the internal space of the tubular portion of the tab 78 through the fracture or crack. Consequently, the inversion plate 77 may not be deformed toward the sealing body 71 even when the pressure in the outer casing increases. As a result, the current interruption mechanism 74 may cease to operate normally.

The present inventors conducted various verification tests on such a configuration for preventing breakage of a current interruption mechanism for a prismatic secondary battery, and then found that the problem above could be solved by forming fixing pawl portions at a plurality of locations in the second insulating member 81 to be hooked and fixed on the flange portion 78a, formed at the lower end side of the tubular portion of the tab member 78, from the outer peripheral side, so that the second insulating member 81 and the tab member 78 could be robustly joined to each other.

The inventors also found that a new problem would arise with the second insulating member 81 simply fixed on the flange portion 78a formed at the lower end side of the tubular portion of the tab member 78, with a plurality of fixing pawl portions formed at the second insulating member 81. Specifically, the second insulating member 81 is generally formed of a resin material because it should be formed of an insulating and deformable material so that the fixing pawl portions can be hooked and fixed on the flange portion 78a of the tab member 78. When each of the fixing pawl portions is formed in the second insulating member 81 of a resin material, a through-hole is formed in the main body of the second insulating member 81 at the base of the fixing pawl portion because of the production process.

If counter-electromotive current is generated in a state in which nonaqueous electrolyte is present in the through-hole formed at the base of the fixing pawl portion of the second insulating member 81 immediately after the battery internal pressure increases to bring the current interruption mechanism 74 into operation and the inversion plate 77 is thus deformed to cut off the electrical connection between the inversion plate 77 and the collector 73, sparks may occur in the through-hole, and the heat therefrom may fuse and carbonize the second insulating member 81 around the through-hole formed at the base of the fixing pawl portion of the second insulating member 81. If the carbonized portion is conductive, electrical continuity may be established again between the collector 73 and the collector tab 78 or the inversion plate 77, thereby impairing the original function.

SUMMARY

The present invention provides a highly reliable prismatic secondary battery with a current interruption mechanism between a collector and an external terminal, in which the it is difficult for the current interruption mechanism to be broken even when the battery is subjected to shock due to vibration or being dropped. The invention also provides a prismatic secondary battery that reduces the possibility that the current interruption mechanism conducts again after the current interruption mechanism is brought into operation.

According to the invention, a prismatic secondary battery includes:

a prismatic outer casing having a mouth;

an electrode assembly housed in the prismatic outer casing and having a positive electrode plate and a negative electrode plate;

a positive electrode collector electrically connected to the positive electrode plate;

a negative electrode collector electrically connected to the negative electrode plate;

a sealing body sealing the mouth of the outer casing and having a through-hole;

at least one external terminal inserted in the through-hole of the sealing body while being electrically insulated from the sealing body with a first insulating member interposed therebetween;

a conductive member having a tubular portion;

an inversion plate formed of a conductive material that is deformed when the pressure inside the battery exceeds a particular level; and a second insulting member having a first through-hole and formed between the inversion plate and at least one of the positive electrode collector and the negative electrode collector.

At least one of the positive electrode collector and the negative electrode collector is electrically connected to the inversion plate through the first through-hole formed in the second insulating member.

The tubular portion of the conductive member has one end portion electrically connected to the external terminal and the other end portion sealed with the inversion plate.

In the prismatic secondary battery, the second insulating member has a plurality of fixing pawl portions. The fixing pawl portions are hooked and fixed to a fixing portion formed on the outer surface side of the conductive member.

In the prismatic secondary battery according to the invention, a pressure-sensitive current interruption mechanism as safety means includes the conductive member having the tubular portion, the inversion plate, the second insulating member, and at least one of the positive electrode collector and the negative electrode collector. More specifically, the inversion plate is deformed when the pressure inside the outer casing increases. The connecting portion between the collector and the inversion plate, or a brittle portion such as a thin portion or a groove portion provided in the collector fractures thereby to cut off the electrical connection between the collector and the inversion plate. Consequently, current ceases to flow between the prismatic secondary battery and an external circuit. A highly reliable prismatic secondary battery thus can be obtained.

In the prismatic secondary battery of the invention, the second insulating member and the conductive member are fixed together. Therefore, stress is less likely to be exerted on the connecting portion between at least one of the positive electrode collector and the negative electrode collector and the inversion plate even when the battery is subjected to shock due to vibration or being dropped to cause the electrode assembly to shift, thereby preventing breakage of the connecting portion between at least one of the positive electrode collector and the negative electrode collector and the inversion plate. As a result, a highly reliable prismatic secondary battery can be obtained, in which it is difficult for the current interruption mechanism is to be broken even when the secondary prismatic battery is subjected to shock due to vibration or being dropped.

The prismatic secondary battery of the invention is applicable to nonaqueous electrolyte secondary batteries and to alkaline secondary batteries such as nickel-hydrogen secondary batteries. It is also applicable to batteries including, as an electrode assembly, a flattened wound electrode assembly or a stacked electrode assembly in which positive electrode plate(s) and negative electrode plate(s) are insulated from each other with separators interposed therebetween. The invention can achieve predetermined advantages as long as it is applied to one of the positive electrode side and the negative electrode side, but it may be applied to both sides.

In the prismatic secondary battery of the invention, it is preferable that the fixing portion formed on the outer surface side of the tubular portion of the conductive member be a flange portion or a concave portion.

Such a configuration enables the easy manufacturing of a prismatic secondary battery that can achieve the foregoing advantages of the invention because the flange portion or the concave portion can be easily formed on the outer surface side of the tubular portion of the conductive member.

In the invention, the position of the fixing portion provided in the conductive member is not specifically limited as long as it is provided on the outer surface side of the conductive member. For example, the upper end of the tubular portion of the conductive member may possibly be formed as the fixing portion. In this case, the fixing portion such as a flange portion or a concave portion is preferably provided on the outer surface side of the tubular portion of the conductive member. More preferably, the fixing portion such as a flange portion or a concave portion is formed on the outer surface side of the other end portion of the tubular portion of the conductive member, that is, on the outer side surface of the end portion to which the inversion plate is connected, of the tubular portion of the conductive member on the side.

In the prismatic secondary battery of the invention, it is preferable that the second insulating member further have a joint portion with the first insulating member.

With such a configuration, the second insulating member is fixed not only to the conductive member but also to the first insulating member, thereby better achieving the foregoing advantages of the invention.

In the prismatic secondary battery of the invention, it is preferable that the second insulating member contain a resin material, each of the fixing pawl portions have a first region extending vertically to the main body of the second insulating member and a second region formed on the first region and protruded from the first region toward the conductive member, the main body of the second insulating member have a second through-hole formed at the base of the first region on a side to which the second region protrudes, and the second through-hole be closed with an insulating member.

The second insulating member contains a resin material because it should be formed with an insulating and deformable member so that the fixing pawl portions can be hooked and fixed to the conductive member. In general, the fixing pawl portions are formed at the second insulating member containing a resin material by injecting and solidifying a liquid resin material in a mold or through the press-forming to a plate of a resin material. However, due to the characteristics of the injection mold and the press mold, a through-hole (second through-hole) is separately formed in the main body of the second insulating member at the base of the fixing pawl portion. In the prismatic secondary battery of the invention, this second through-hole is closed with the insulating member. Therefore, sparks do not occur in the second through-hole immediately after the current interruption mechanism is brought into operation, so that the second insulating member around the second through-hole is no longer fused nor carbonized. Thus, the prismatic secondary battery with such a configuration can prevent electrical continuity between the collector and the tubular portion of the conducting member or the inversion plate from being established again. As a result, a highly reliable prismatic secondary battery can be obtained.

In the prismatic secondary battery of the invention, it is preferable that the second insulating member contain a resin material, the main body of the second insulating member have a second through-hole formed at the base of the first region on a side to which the second region protrudes, and at least one of the positive electrode collector and the negative electrode collector connected to the inversion plate include an insulating layer in a region facing the second through-hole.

It is difficult for sparks to occur immediately after the current interruption mechanism is brought into operation when an insulating layer is formed in a region of the collector connected to the inversion plate that faces the second through-hole, thereby preventing the second insulating member around the second through-hole from being fused and carbonized. Therefore, the prismatic secondary battery with such a configuration can prevent electrical continuity between the collector and the tubular portion of the conductive member or the inversion plate from being established again immediately after the current interruption mechanism is brought into operation. As a result, a highly reliable prismatic secondary battery can be obtained.

In the prismatic secondary battery of the invention, it is preferable that the second insulating member contain a resin material, the main body of the second insulating member have a second through-hole formed at the base of the first region on a side to which the second region protrudes, and at least one of the positive electrode collector and the negative electrode collector connected to the inversion plate have a concave portion or a through-hole in a region facing the second through-hole.

It is difficult for sparks to occur in the second through-hole immediately after the current interruption mechanism is brought into operation when a concave portion or a through-hole is formed in a region facing the second through-hole in the collector connected to the inversion plate, thereby preventing the second insulating member around the second through-hole from being fused and carbonized. Therefore, the prismatic secondary battery with such a configuration can prevent electrical continuity between the collector and the tubular portion of the conductive member or the inversion plate from being established again immediately after the current interruption mechanism is brought into operation. As a result, a highly reliable prismatic secondary battery can be obtained.

In the prismatic secondary battery of the invention, it is preferable that the second insulating member contain a resin material, the main body of the second insulating member have a second through-hole formed at the base of the first region on a side to which the second region protrudes, and at least one of the positive electrode collector and the negative electrode collector connected to the inversion plate be folded in the vicinity of a region facing the second through-hole in a direction away from the second insulating member.

The distance between the second through-hole and the collector can be increased when the collector connected to the inversion plate is folded in the vicinity of the region facing the second through-hole in a direction away from the second insulating member. Consequently, it is difficult for sparks to occur in the second through-hole immediately after the current interruption mechanism is brought into operation, thereby preventing the second insulating member around the second through-hole from being fused and carbonized. Therefore, the prismatic secondary battery with such a configuration can prevent electrical continuity between the collector and the tubular portion of the conductive member or the inversion plate from being established again immediately after the current interruption mechanism is brought into operation. As a result, a highly reliable prismatic secondary battery can be obtained.

In the prismatic secondary battery of the invention, it is preferable that the second insulating member contain a resin material, the main body of the second insulating member have a second through-hole formed at the base of the first region on a side to which the second region protrudes, and at least one of the positive electrode collector and the negative electrode collector connected to the inversion plate not be present in a region facing the second through-hole.

Sparks can be prevented when the collector connected to the inversion plate is not present in the region facing the second through-hole, and the second insulating member around the second through-hole can be prevented from being fused and carbonized.

In the prismatic secondary battery of the invention, it is preferable that at least one opening or notch be formed at a portion of the collector member that faces the second insulating member, an projection having an increased-diameter portion having a diameter larger than other portions at the top of the projection be formed at a a portion of the second insulating member that faces at least one opening or notch formed in the collector member, and the at least one opening or notch formed in the collector member be engaged with the projection formed in the second insulating member.

With such a configuration, once after the second insulating member and the collector member are integrated, they are not easily separated from each other because the increased diameter portion functions to prevent falling out. As a result, a highly reliable prismatic secondary battery can be obtained, in which it is difficult for the current interruption mechanism is to be broken even when the battery is subjected to shock due to vibration or being dropped. The increased-diameter portion at the top of the projection can be formed simply by inserting the projection into the corresponding opening formed in the positive electrode collector or negative electrode collector and thereafter heating or pushing the tip end portion of the projection to increase the diameter. An engagement portion such as a pawl may be provided as the increased-diameter portion at the top of the projection, and the engagement portion may be inserted into the opening, thereby achieving tight integration with each other.

In regards to the use of at least one opening or notch, the opening is employed when the width of the short side of the prismatic secondary battery is large, whereas the notch is employed when the width of the short side is small. In either case, the joining strength between the positive electrode collector or the negative electrode collector and the second insulating member can be increased. When the notch is employed, the center of the notch may not necessarily be present within the positive electrode collector or the negative electrode collector.

In the prismatic secondary battery of the invention, it is preferable that the collector member be formed by folding a piece of plate material.

Such a configuration enables the easy formation of a collector, and increases the strength of the collector. Therefore, a strong prismatic secondary battery can be obtained.

In the prismatic secondary battery of the invention, it is preferable that the collector contain a conductive material having rigidity.

The collector containing a conductive material having rigidity is preferable in that the shifting of the collector in the inside of the outer casing can be prevented even when the battery is subjected to shock due to vibration or being dropped. Preferably, the conductive material having rigidity is a metal material having a thickness of not less than 0.3 mm, more preferably, a metal material having a thickness of not less than 0.5 mm.

In the prismatic secondary battery of the invention, it is preferable that at least one of a thin portion and a groove be formed at the periphery of a portion of at least one of the positive electrode collector and the negative electrode collector connected to the inversion plate.

When a brittle portion such as a thin portion or a groove is formed at the periphery of the connecting portion between at least one of the positive electrode collector and the negative electrode collector and the inversion plate, this brittle portion easily fractures when the inversion plate is deformed, thereby improving the reliability of operation of the current interruption mechanism. The operating pressure of the current interruption mechanism can be set at a particular value by setting as appropriate the thickness of the brittle portion and the area in which the brittle portion is formed. It is more preferable that a thin portion having a small thickness be provided at the periphery of the connecting portion between at least one of the positive electrode collector and the negative electrode collector and the inversion plate, and an annular groove portion be provided in this thin portion to encircle the connecting portion.

In the prismatic secondary battery of the invention, it is preferable that a through-hole be formed in the external terminal so as to bring the outside of the battery into communication with the space on the inner surface side of the tubular portion of the conductive member, and the through-hole in the external terminal be sealed with a sealing member.

The through-hole formed in the external terminal is aimed to carry out a leak test for the current interruption mechanism during assembly. However, electrolyte or cleaning fluid may enter the through-hole in the external terminal during pouring of the electrolyte or during cleaning. If electrolyte or cleaning fluid enters the through-hole, the current interruption mechanism may be corroded and thus cease to function normally. In the prismatic secondary battery of the invention, the through-hole is sealed with the sealing member, and in addition, the space between the through-hole and the current interruption mechanism is a sealed space, thereby preventing electrolyte or cleaning fluid from entering the through-hole. Therefore, the current interruption mechanism will not be corroded, and the current interruption mechanism will not cease to function normally. As a result, a prismatic secondary battery with high reliability can be obtained. A sealing plug of an elastic member may be used as the sealing member. A metal member may be used as the sealing member. In this case, the through-hole may be sealed by fitting the metal member in the through-hole and welding the fitted portion by applying high-energy beams such as laser beams. Alternatively, a sealing member containing resin or a sealing member of an elastic member and a metal member also can be used.

In the prismatic secondary battery of the invention, the electrode assembly may be a flattened electrode assembly that has a plurality of stacked positive electrode exposed portions at one end and a plurality of stacked negative electrode exposed portions at the other end, with the positive electrode exposed portions being disposed so as to face to one sidewall of the prismatic outer casing and the negative electrode exposed portions being disposed so as to face to the other sidewall of the prismatic outer casing, and with the positive electrode collector being connected to the positive electrode exposed portions and the negative electrode collector being connected to the negative electrode exposed portions.

When the positive electrode exposed portions are disposed at one end of the prismatic outer casing and the negative electrode exposed portions at the other end, the distance between the positive electrode collector and the negative electrode collector can be enlarged, and so the prismatic secondary battery can be rendered high-capacity and assembly of the prismatic secondary battery will be facilitated. In addition, with such prismatic secondary battery of the invention, the collector will be connected to the exposed portions of the stacked substrates, and so a battery with superior output characteristics will be obtained.

BRIEF DESCRIPTION OF THE DRAWINGS

The invention will be described with reference to the accompanying drawings, wherein like numbers reference like elements.

FIG. 1A is a sectional view of a prismatic nonaqueous electrolyte secondary battery according to an embodiment, FIG. 1B is a sectional view along a line IB-IB in FIG. 1A, and FIG. 1C is a sectional view along a line IC-IC in FIG. 1A.

FIG. 4A is an opened-out front view and FIG. 4B is an opened-out side view of a positive electrode collector of the prismatic nonaqueous electrolyte secondary battery shown in FIG. 1.

FIG. 7 is a sectional view of a portion corresponding to the section along the line VIC-VIC in FIG. 6B of the current interruption mechanism provided on the positive electrode side of the prismatic nonaqueous electrolyte secondary battery shown in FIG. 1.

FIG. 8 is an enlarged view of a portion VIII in FIG. 7.

FIG. 9 is a view of a first modification, corresponding to FIG. 8.

FIG. 14A is a sectional view of a current interruption mechanism in a prismatic secondary battery of the related art, and FIG. 14B is a sectional view of a current interruption mechanism in another prismatic secondary battery of the related art.

DESCRIPTION OF EXEMPLARY EMBODIMENT

Figure 2:
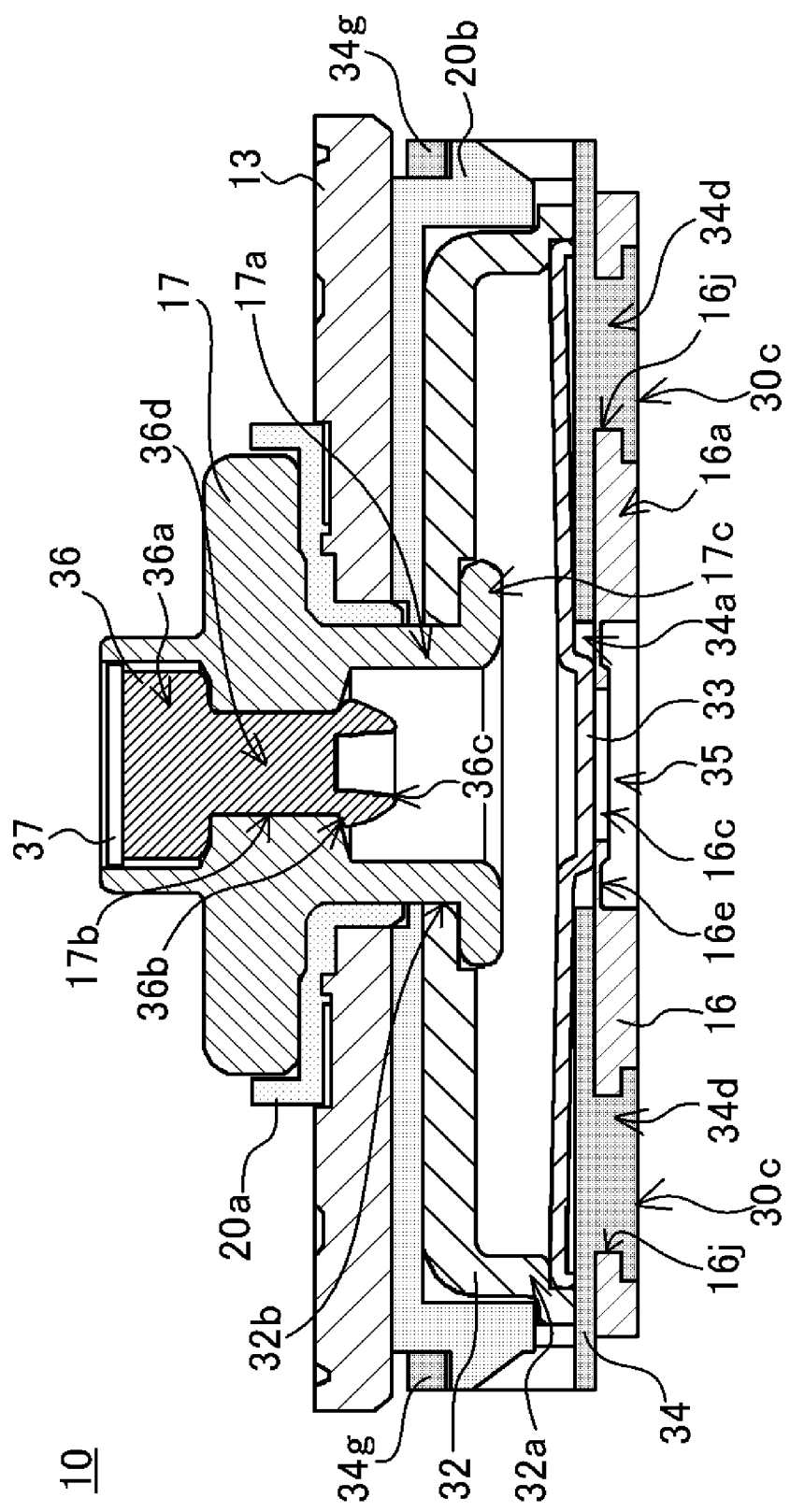
FIG. 2 is a sectional view, in the direction of the short sides of the outer casing, of a current interruption mechanism provided on a positive electrode side of the prismatic nonaqueous electrolyte secondary battery shown in FIG. 1.

An embodiment for carrying out the invention will now be described in detail with reference to the accompanying drawings. It is to be understood, however, that the following embodiment is intended as an illustrative example of a prismatic nonaqueous electrolyte secondary battery for the purpose of comprehending the technical concepts of the invention, and is not intended to limit the invention to this particular prismatic secondary battery; the invention can equally well be applied to yield many other variants without departing from the scope and spirit of the technical concepts set forth in the claims. Note that although the invention can be applied to prismatic secondary batteries that have an electrode assembly with a flattened shape produced by stacking or by winding positive electrode plate(s) and negative electrode plate(s) together with separators interposed, the description below is of a battery with a flattened wound electrode assembly, as a representative example.

Embodiment

First, the prismatic nonaqueous electrolyte secondary battery of the embodiment will be described using FIG. 1 to FIG. 8. First, the prismatic nonaqueous electrolyte secondary battery of the embodiment will be described with reference to FIG. 1.

The prismatic nonaqueous electrolyte secondary battery 10 of the embodiment has a flattened wound electrode assembly 11 in which a positive electrode plate and a negative electrode plate are wound together with separators (all omitted from the drawings) interposed. To fabricate the positive electrode plate, a positive electrode active material mixture is spread over both sides of a positive electrode substrate of aluminum foil, and the resulting object is dried and rolled, then is slit at one end so that the aluminum foil is exposed in strips aligned in the lengthwise direction. To fabricate the negative electrode plate, a negative electrode active material mixture is spread over both sides of a negative electrode substrate of copper foil, and the resulting object is dried and rolled, then is slit at one end so that the copper foil is exposed in strips aligned in the lengthwise direction.

The positive electrode plate and the negative electrode plate obtained in the foregoing manner are then wound together with polyethylene microporous separators interposed therebetween in a state in which neither the aluminum foil exposed portions of the positive electrode plate nor the copper foil exposed portions of the negative electrode plate overlap with the active material layer of their opposing electrode, thereby fabricating a flattened wound electrode assembly 11 that includes, at one end of the winding axis, a plurality of positive electrode substrate exposed portions 14 that are stacked, and at the other end, a plurality of negative electrode substrate exposed portions 15 that are stacked.

The positive electrode substrate exposed portions 14 are stacked together and electrically connected to a positive electrode external terminal 17 with a positive electrode collector 16 interposed therebetween. Likewise, the negative electrode substrate exposed portions 15 are stacked together and electrically connected to a negative electrode external terminal 19 with a negative electrode collector 18 interposed therebetween. The positive electrode external terminal 17 and the negative electrode external terminal 19 are fixed to a sealing body 13, with insulating members 20 and 21, respectively, interposed therebetween. In the prismatic nonaqueous electrolyte secondary battery 10 of the embodiment, a pressure-sensitive current interruption mechanism is located between the positive electrode collector 16 and the positive electrode external terminal 17 or between the negative electrode collector 18 and the negative electrode external terminal 19. The specific structure of this current interruption mechanism will be described later.

To fabricate the prismatic nonaqueous electrolyte secondary battery 10 of the embodiment, the flattened wound electrode assembly 11 fabricated in the foregoing manner is inserted into a prismatic outer casing 12, with a resin sheet 23 interposed around the periphery except at the sealing body 13. Subsequently, the sealing body 13 is laser-welded to the mouth portion of the outer casing 12, after which nonaqueous electrolyte is poured in through an electrolyte pour hole 22a and the electrolyte pour hole 22a is sealed. The sealing body 13 has a gas escape valve 22b that opens when gas pressure is exerted that exceeds the actuation pressure for the current interruption mechanism.

Furthermore, in the flattened wound electrode assembly 11 of the prismatic nonaqueous electrolyte secondary battery 10 of the embodiment, the stacked positive electrode substrate exposed portions 14 of the positive electrode plate are split into two groups, between which two intermediate conductive members 24 for the positive electrode are held. Likewise, the stacked negative electrode substrate exposed portions 15 of the negative electrode plate are split into two groups, between which two intermediate conductive members 25 for the negative electrode are held. The two positive electrode intermediate conductive members 24 and the two negative electrode intermediate conductive members 25 are held by insulative intermediate members 24p and 25p, respectively, that contains resin material.

On the outermost surface of each of the two positive electrode substrate exposed portion 14 groups, which are located at the two positive electrode intermediate conductive members 24, a positive electrode collector 16 is disposed. likewise on the outermost surface of each of the two negative electrode substrate exposed portion 15 groups, which are located at the two negative electrode intermediate conductive members 25, a negative electrode collector 18 is disposed. The positive electrode intermediate conductive members 24 contain aluminum, the same material as the positive electrode substrate. The negative electrode intermediate conductive members 25 contain copper, the same material as the negative electrode substrate. The positive electrode intermediate conductive members 24 can have a shape substantially identical to that of the negative electrode intermediate conductive members 25. The positive electrode substrate exposed portions 14 are resistance-welded both to the positive electrode collector 16 and to the positive electrode intermediate conductive members 24. Likewise, the negative electrode substrate exposed portions 15 are joined both to the negative electrode collector 18 and to the negative electrode intermediate conductive members 25 by resistance welding.

The prismatic nonaqueous electrolyte secondary battery 10 of the embodiment illustrates an example of using two positive electrode intermediate conductive members 24 and two negative electrode intermediate conductive members 25. However, it will alternatively be possible, depending on the required output of the battery, to use one each, or three or more. With a structure that uses two or more, the positive electrode intermediate conductive members 24 and the negative electrode intermediate conductive members 25 will be held by one insulative intermediate member of resin material, and so can be positioned and disposed in a stable state between the two split-up groups of substrate exposed portions.

Next will be described the methods for resistance-welding the positive electrode collector 16 and the positive electrode intermediate conductive members 24 to the positive electrode substrate exposed portions 14 of the flattened wound electrode assembly 11, and the methods for resistance-welding the negative electrode collector 18 and the negative electrode intermediate conductive members 25 to the negative electrode substrate exposed portions 15. However, in the prismatic nonaqueous electrolyte secondary battery 10 of the embodiment, the shapes of the positive electrode intermediate conductive members 24 and of the negative electrode intermediate conductive members 25 are substantially identical, and moreover the resistance-welding methods for both are substantially similar. Therefore, the description below deals with the methods on the positive electrode plate side only, as being representative.

First, the positive electrode substrate exposed portions 14 of aluminum foil, of the flattened wound electrode assembly 11, are stacked. The stacked positive electrode substrate exposed portions 14 are split into two groups from the winding center portion outward to the two sides, and each group is bunched around a center that is the line along ¼ of the thickness of the wound electrode assembly 11. Subsequently, the positive electrode collector 16 is disposed on the outermost peripheries, and the positive electrode intermediate conductive members 24 are disposed on the inner peripheries, of the two bunches of positive electrode substrate exposed portions 14, in such a manner that the truncated cone-shaped protrusions of both of the positive electrode intermediate conductive members 24 contact against the positive electrode substrate exposed portions 14. Each bunch of aluminum foil has thickness of about 660 μm and 44 stacked substrates (for a total of 88). The items used for the positive electrode collector 16 are fabricated by punching and bend-processing, etc., a 0.8 mm-thick aluminum sheet.

Next, the flattened wound electrode assembly 11, in which the positive electrode collector 16 and the positive electrode intermediate conductive members 24 are disposed, is disposed between a pair of resistance welding electrodes, omitted from the drawings, that are disposed one above the other. Subsequently, the pair of resistance welding electrodes are brought into contact with the positive electrode collector 16, each of which is disposed on the outermost periphery of one of the two bunches of positive electrode substrate exposed portions 14. A suitable degree of pushing pressure is then applied between the pair of resistance welding electrodes, and resistance welding is performed under certain predetermined conditions. Since the protrusions of the positive electrode intermediate conductive members 24 thereby act as projections, the positive electrode collector 16 and two bunches of positive electrode substrate exposed portions 14, which have been disposed between the pair of resistance welding electrodes, heat up well and so large nuggets are formed. Consequently, the welds are of extremely high strength between the positive electrode collector 16 and the two bunches of positive electrode substrate exposed portions 14, the welds among the positive electrode substrate exposed portions 14, and the welds between the two bunches of positive electrode substrate exposed portions 14 and the positive electrode intermediate conductive members 24.

Moreover, during such resistance welding, the positive electrode intermediate conductive members 24 are disposed in a stably positioned state between the two bunches of positive electrode substrate exposed portions 14. This leads to the resistance welding in an accurate and stable state, the curbing of variation in the weld strength, and the realizing of low resistance of the welds. A prismatic secondary battery that is capable of high current cycling thus can be manufactured. By repeating such resistance welding as many times as the number of positive electrode intermediate conductive members 24 used, all of the resistance welding is executed—between the positive electrode collector 16 and the two bunches of positive electrode substrate exposed portions 14, among the positive electrode substrate exposed portions 14, and between the two bunches of positive electrode substrate exposed portions 14 and the positive electrode intermediate conductive members 24. This resistance welding is carried out in the same manner for the negative electrode.

Now will be described the pressure-sensitive current interruption mechanism that is interposed between the positive electrode collector 16 and the positive electrode external terminal 17 or between the negative electrode collector 18 and the negative electrode external terminal 19. This current interruption mechanism can be provided on the positive electrode side only, on the negative electrode side only, or on both the positive electrode and negative electrode sides. Below, the case where the mechanism is provided on the positive electrode side only is described, with reference to FIG. 2 to FIG. 8.

As FIGS. 1A to 1C show, the positive electrode collector 16 is connected to the positive electrode substrate exposed portions 14 disposed at one end of the wound electrode assembly 11. The positive electrode collector 16 is electrically connected to the positive electrode external terminal 17. As shown in FIGS. 4A and 4B, which are an opened-out front view and side view, respectively, positive electrode collector 16 has a first region 16a that is disposed parallel to the sealing body 13, and a pair of second regions 16b that extend outward from the first region 16a in mutually opposite directions, are folded at the dashed lines (boundaries 16f), and are connected to the positive electrode substrate exposed portions 14. The positive electrode collector 16 is fabricated by punching from aluminum sheet of thickness 0.8 mm, therefore are rigid, and cannot be folded with a small force. In FIG. 4A, notched portions are formed in both of the boundaries 16f in order to facilitate folding of the positive electrode collector 16 along the boundaries 16f.

In the central portion of the first region 16a of the positive electrode collector 16, there is formed a connection forming hole 16c. On the centerline c that passes through the center of the connection forming hole 16c in the direction of the long sides of the sealing body 13, there are formed a first opening 16g and a second opening 16h, one on each side of the connection forming hole 16c. In the direction perpendicular to the centerline c, there are formed two third openings 16j, one on each side. The diameters of the first opening 16g and second opening 16h are identical. The diameters of both two third openings 16j are identical and are determined so as to be smaller than the diameters of the first opening 16g and second opening 16h. In the second regions 16b of the positive electrode collector 16, there are formed ribs 16d on the side facing the positive electrode substrate exposed portions 14. These ribs 16d perform the roles of positioning the positive electrode collector 16 relative to the positive electrode substrate exposed portions 14, positioning the wound electrode assembly 11 relative to the battery outer casing 12, preventing the spatter that occurs during resistance welding of the positive electrode collector 16 to the positive electrode substrate exposed portions 14 from entering the wound electrode assembly 11, and so forth. The portion around the circumference of the connection forming hole 16c in the first region 16a is an annular thin region 16e whose thickness is smaller than those of the other portions.

Figure 3:
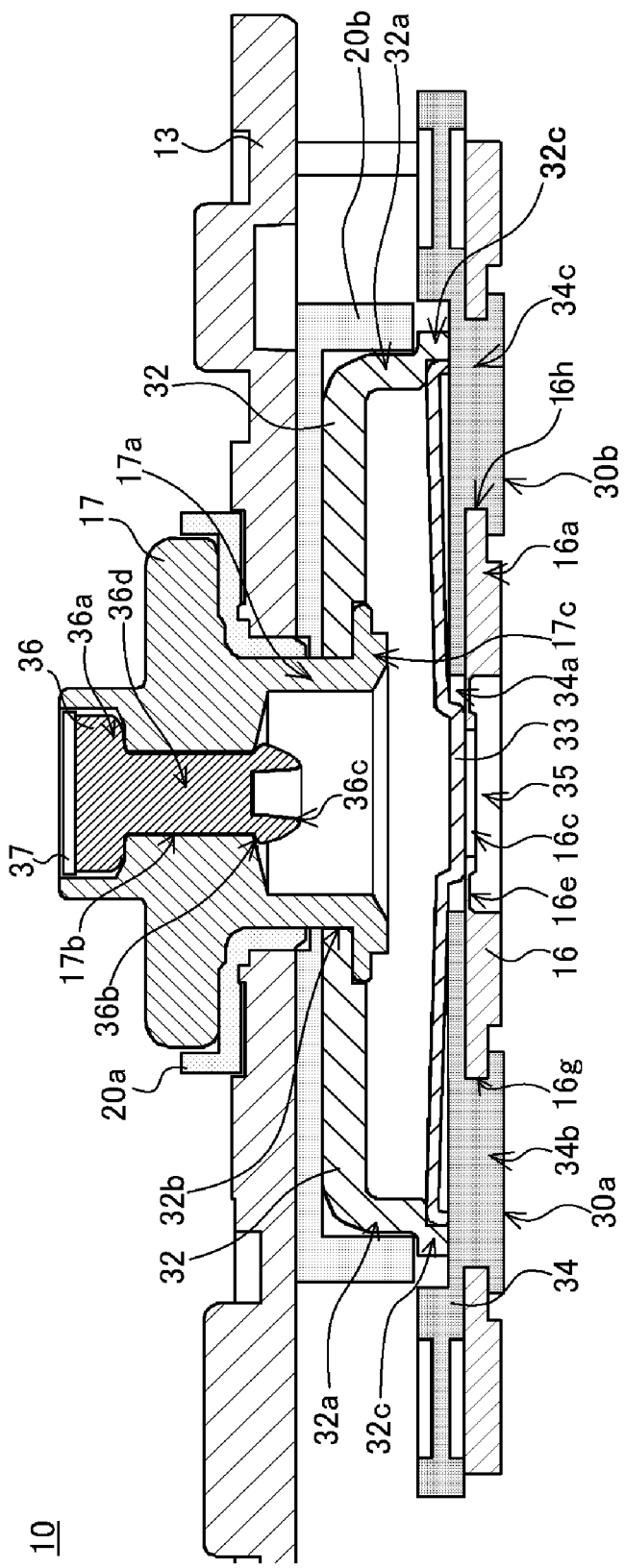
FIG. 3 is a sectional view, in the direction of the long sides of the outer casing, of the current interruption mechanism provided on the positive electrode side of the prismatic nonaqueous electrolyte secondary battery shown in FIG. 1.

The positive electrode external terminal 17, as shown in FIG. 2 and FIG. 3, has tubular portion 17a, and a through-hole 17b formed in its interior. The tubular portion 17a of the positive electrode external terminal 17 is inserted into holes formed in an upper first insulating member 20a such as a gasket, in the sealing body 13, in a lower first insulating member 20b and in conductive member 32 having a tubular portion 32a, and the tip portions 17c are swaged and fixed so as to be mutually integrated. The conductive member 32 has a tubular portion 32a formed at its battery interior end, while at its battery exterior end—that is, sealing body 13 end, where the diameter narrows—there is formed opening 32b into which the tubular portion 17a of the positive electrode external terminal 17 is inserted. The tip portion 17c of the tubular portion 17a of the positive electrode external terminal 17 is swaged near the opening 32b in the conductive member 32, and is laser-welded to the connection portion of the conductive member 32. Thereby, the positive electrode external terminal 17 is electrically connected to the conductive member 32 in such a state as to be electrically insulated from the sealing body 13 by the upper first insulating member 20a and the lower first insulating member 20b. Both the upper first insulating member 20a and the lower first insulating member 20b correspond to the first insulating member of the invention.

A flange portion 32c is formed at the tip end on the battery interior side of the tubular portion 32a of the conductive member 32. The periphery of the inversion plate 33 is hermetically welded and sealed on the inner surface side of the flange portion 32c. The inversion plate 33 is shaped to slightly protrude toward the battery interior side from the periphery toward the center; that is, arranged to be in a slanted positional relationship with the sealing body 13. The inversion plate 33 contains a conductive material and has a function as a valve that is deformed toward the outer side of the battery when the pressure in the battery outer casing 12 increases. The first region 16a of the positive electrode collector 16 contacts against the central portion of the inversion plate 33. An inner wall portion of the connection forming hole 16c of the thin region 16e formed in the first region 16a and the surface of the inversion plate 33 are laser-welded at a plurality of places. Although not shown, the portion where the inner wall portion of the connection forming hole 16c of the thin region 16e and the surface of the inversion plate 33 are welded together corresponds to the connecting portion in the invention.

Furthermore, between the first region 16a of positive electrode collector 16 and the inversion plate 33, there is formed a second insulating member 34 that contains resin material and has a first through-hole 34a. The first region 16a of positive electrode collector 16 is electrically connected to the inversion plate 33 through the first through-hole 34a. Around this first through-hole 34a in the second insulating member 34, there are formed a first projection 34b in the position corresponding to the first opening 16g in the first region 16a of the positive electrode collector 16, a second projection 34c in the position corresponding to the second opening 16h, and a third projection 34d in the position corresponding to the third openings 16j.

The first to third projections 34b to 34d of the second insulating member 34 are inserted into the first to third openings 16g to 16j, respectively, formed in the first region 16a of positive electrode collector 16, and by heating the tips of the first to third projections 34b to 34d to widen their diameters, the second insulating member 34 and the first region 16a of positive electrode collector 16 are fixed to each other. As a result, the first to third projections 34b to 34d of the second insulating member 34 are, thanks to the widened-diameter portions formed in each of them, prevented from falling out from the first to third openings 16g to 16j formed in the first region 16a of positive electrode collector 16, and the second insulating member 34 are robustly joined to the first region 16a of positive electrode collector 16. The first to third fixing portions 30a to 30c are formed from these first to third openings 16g to 16j formed in the first region 16a of positive electrode collector 16 and from the first to third projections 34b to 34d of the second insulating member 34. The second insulating member 34 and the lower first insulating member 20b, which constitute the first insulating member, will preferably be fixed together by engaging to each other. There is no particular restriction on such fixing method, but in this embodiment, the second insulating member 34 and the lower first insulating member 20b constituting the first insulating member are fixed together by a fixing method using latch.

Thus, the positive electrode substrate exposed portions 14 are electrically connected to the positive electrode external terminal 17 via the first and second regions 16a and 16b and thin region 16e of positive electrode collector 16, and via the inversion plate 33 and the conductive member 32. The current interruption mechanism of this embodiment is formed with the tubular portion 32a of the conductive member 32, the inversion plate 33, the second insulative member 34, and the thin region 16e that is formed in the first region 16a of positive electrode collector 16.

Specifically, the inversion plate 33 swells toward the through-hole 17b of the positive electrode external terminal 17 when the pressure in the battery outer casing 12 increases. In addition, the thin region 16e of the first region 16a of the positive electrode collector 16 is welded to the central portion of the inversion plate 33. Therefore, the first region 16a of the positive electrode collector 16 fractures at the thin region 16e when the pressure in the battery outer casing 12 exceeds a particular level. Consequently, the electrical connection between the inversion plate 33 and the first region 16a of the positive electrode collector 16 is cut off.

In this manner, the thin region 16e facilitates fracture at the thin region 16e when the inversion plate 33 is deformed. Therefore, fracture occurs reliably at the thin region 16e when the pressure inside the battery increases, thereby improving the reliability of the prismatic nonaqueous electrolyte secondary battery 10. In addition, the pressure that causes fracture at the thin region 16e can be set at a particular value by setting as appropriate the thickness of the thin region 16e and the region where the thin region 16e is formed, thereby improving the reliability.

In the example shown here, the annular thin region 16e having a thickness smaller than the other portions is formed around the periphery of the connection forming hole 16c of the first region 16a. More preferably, an annular groove is provided in the thin region 16e to encircle the connection forming hole 16c. This groove may be formed to be annularly intermittent. Alternatively, the thin region 16e may be formed such that the thickness of the peripheral portion of the connection forming hole 16c of the first region 16a is set equal to the thickness of the other portions and a groove is formed to be annular or annularly intermittent. The thin region 16e and the groove are not essential. The connection strength between the inversion plate 33 and the positive electrode collector 16 may be adjusted so that the connection between the inversion plate 33 and the positive electrode collector 16 is cut off when the inversion plate 33 is deformed, without the provision of the thin region 16e and the groove.

Figure 5:
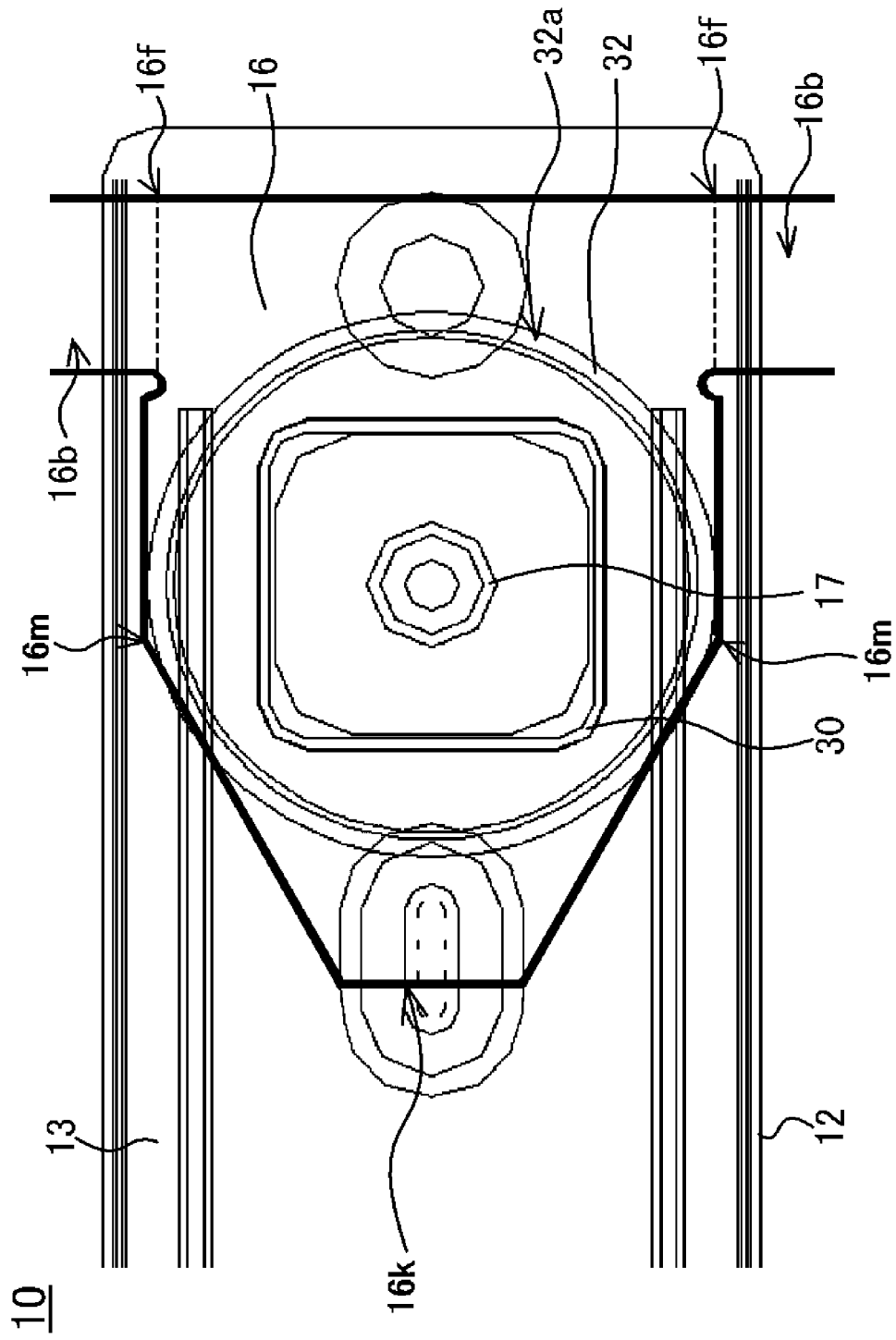
FIG. 5 is a schematic plan view of a portion corresponding to FIG. 3, illustrating an arrangement relationship between a first region of the positive electrode collector and a tubular portion of a conductive member of the prismatic nonaqueous electrolyte secondary battery shown in FIG. 1.

Furthermore, as FIG. 5 shows, in the prismatic nonaqueous electrolyte secondary battery 10 of the embodiment, the boundaries 16f between the first region 16a and the second regions 16b of positive electrode collector 16 are disposed so as to be located further outward than the inner surface of the tubular portion 32a of the conductive member 32. Moreover, one or more edges of the first region 16a, other than the boundaries with the second regions 16b—in this embodiment, all such edges of the first region 16a (protruding edge 16k, side edges 16m and so forth)—are likewise located further outward than the inner surface of the tubular portion 32a of the conductive member 32, so that the first region 16a is so disposed as to be located further outward than the inner surface of the tubular portion 32a of the conductive member 32 in all directions.

With such dispositions, even if the prismatic nonaqueous electrolyte secondary battery 10 is subjected to shock due to vibration, falling, etc., and the wound electrode assembly 11 shifts toward the sealing body 13, the fact that the boundaries 16f between the first region 16a and the second regions 16b of positive electrode collector 16, and the protruding edge 16k of the first region 16a, are disposed so as to be located further outward than the inner surface of the tubular portion 32a of the conductive member 32 means that the first region 16a of positive electrode collector 16, due to contacting against the other edge of the tubular portion 32b of the conductive member 32, will not be able to move any further toward the sealing body 13.

Moreover, the positive electrode collector 16 includes items that have rigidity and cannot be folded by a small force. Thus, when the wound electrode assembly 11 shifts toward the sealing body 13 due to vibration, falling, etc., the force that acts on the first region 16a of positive electrode collector 16 will be absorbed by the second region 16b portions and thus be rendered small. Hence, in the event that the wound electrode assembly 11 shifts toward the sealing body 13 due to vibration, falling, etc., the force exerted will be small, the possibility of the thin region 16e fracturing will thus be suppressed, and the influence upon the actuation of the pressure-sensitive current interruption mechanism 35 will be small. In this way, a prismatic nonaqueous electrolyte secondary battery 10 with superior reliability will be obtained.

Figure 6A:
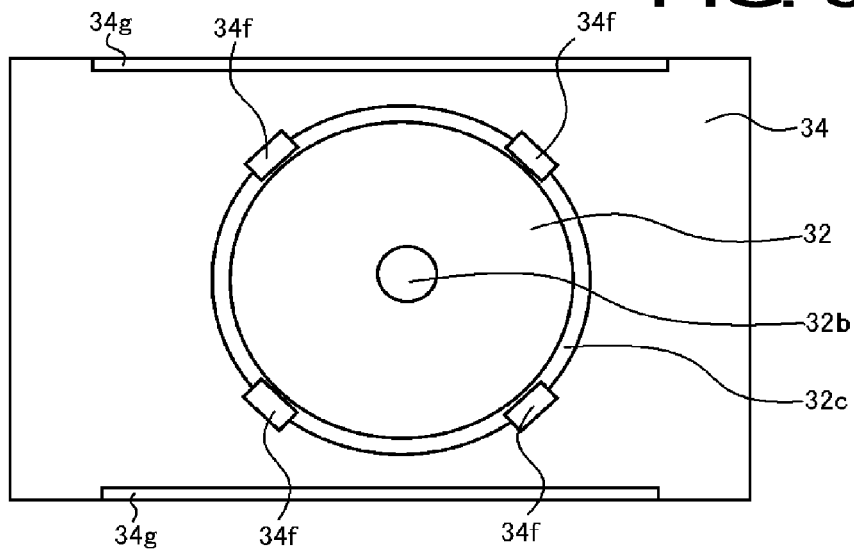
FIG. 6A is a schematic plan view showing the relationship between the conductive member and a second insulating member as viewed from the top of the sealing body.
Figure 6B:
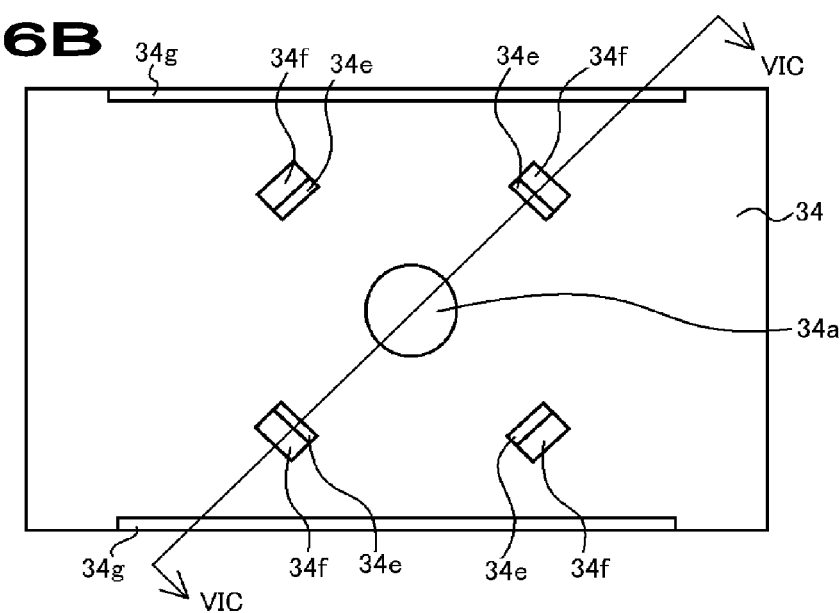
FIG. 6B is a schematic plan view only showing the second insulating member.
Figure 6C:
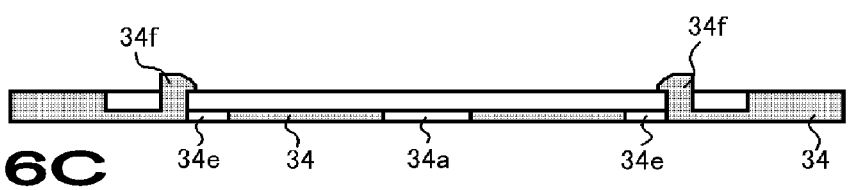
FIG. 6C is a sectional view along a line VIC-VIC in FIG. 6B.

Here, a specific configuration of the second insulating member 34 in the prismatic nonaqueous electrolyte secondary battery 10 of the embodiment will be described with reference to FIG. 6 to FIG. 8. The second insulating member 34 has the first projection 34b to the third projection 34d on the side facing the first region 16a of the positive electrode collector 16, as shown in FIG. 2 and FIG. 3. The second insulating member 34 also has, on the side facing the tubular portion 32a of the conductive member 32, a plurality of, here, four fixing pawl portions 34f as shown in FIG. 6A to FIG. 6C, and latch-fixing portions 34g to be fixed to the lower first insulating member 20b as shown in FIG. 2, FIG. 6A, and FIG. 6B. The latch-fixing portions 34g are not shown in FIG. 6C.

As shown in FIG. 8, these fixing pawl portions 34f each have a first region 34f1 extending vertically to the main body of the second insulating member 34 and a second region 34f2 formed on the first region 34f1 to extend parallel to the main body of the second insulating member 34. These fixing pawl portions 34f can be formed by injecting and solidifying a liquid resin material in a mold or through press-forming of a resin material plate. However, due to the characteristics of the injection mold and the press mold, a second through-hole 34e is inevitably formed adjacent to the first region 34f1 of the fixing pawl portion 34f on the same side as the second region 34f2 of the fixing pawl portion 34f in the main body of the second insulating member 34.

The prismatic nonaqueous electrolyte secondary battery 10 contains nonaqueous electrolyte in the battery outer casing 12 (see FIG. 1). Therefore, if the second through-hole 34e is formed in the second insulating member 34, the nonaqueous electrolyte may enter the inside of the second through-hole 34e. If counter-electromotive current is generated in the state in which the nonaqueous electrolyte is present in the second through-hole 34e immediately after the battery internal pressure increases to bring the current interruption mechanism 35 into operation and the inversion plate 33 is deformed to cut off the electrical connection between the inversion plate 33 and the positive electrode collector 16, sparks may occur in the second through-hole 34e, and the heat therefrom may fuse and carbonize the second insulating member 34 around the second through-hole 34e. If the carbonized portion is conductive, electrical continuity may be established again between the collector 16 and the conductive member 32 or the inversion plate 33 that are included in the current interruption mechanism 35, thereby impairing the original function.

Therefore, in the prismatic nonaqueous electrolyte secondary battery 10 of the embodiment, the second through-hole 34e is separately filled with an insulating member 40 so that electrical continuity is not established between the inside and the outside of the second insulating member 34 through the nonaqueous electrolyte. The insulating member 40 may be formed by pouring and solidifying a liquid resin material into the second through-hole 34e or by inserting and attaching a solid resin material therein. The second through-hole 34e may be filled with the insulating member 40 immediately after the second insulating member 34 is formed or after the second insulating member 34 is combined with the conductive member 32. The material of the insulating member 40 filling the second through-hole 34e is preferably a resin material, and more preferably the same material as that of the second insulating member 34, although not being limited thereto. An insulating tape may be used as the insulating member 40 to be affixed to the second insulating member 34 so as to cover the second through-hole 34e.

These fixing pawl portions 34f are to hook and fix the second insulating member 34 on the outer peripheral side of the flange portion 32c of the conductive member 32. This hook fixing can be easily achieved by bringing the fixing pawl portions 34f of the second insulating member 34 into contact with the outer peripheral side of the flange portion 32c of the conductive member 32, and then pushing against each other, and can integrally fix them to each other robustly. Such a configuration makes stress less likely to be exerted between the positive electrode collector 16 and the inversion plate 33 when the prismatic nonaqueous electrolyte secondary battery 10 is subjected to shock due to vibration or being dropped, causing the wound electrode assembly 11 to shift and the positive electrode collector 16 to be drawn accordingly. This can prevent a fracture or a crack of the connecting portion between the positive electrode collector 16 and the inversion plate 33, and thus it is difficult for the current interruption mechanism 35 to be broken. Therefore, the prismatic nonaqueous electrolyte secondary battery 10 with high reliability can be obtained.

The second insulating member 34 also has the latch-fixing portions 34g. The latch-fixing portions 34g are fixed on the lower first insulating member 20b as shown in FIG. 2. Therefore, stress is further less likely to be exerted between the positive electrode collector 16 and the inversion plate 33 even when the prismatic nonaqueous electrolyte secondary battery 10 is subjected to shock due to vibration or being dropped. Thus, the prismatic nonaqueous electrolyte secondary battery 10 with higher reliability can be obtained.

In the prismatic nonaqueous electrolyte secondary battery 10 of the embodiment, a plurality of fixing pawl portions 34f formed at the second insulating member 34 are hooked and fixed on the outer periphery of the flange portion 32c formed at the tubular portion 32a of the conductive member 32, by way of example. However, it is not indispensable to provide the flange portion 32c at the tubular portion 32a of the conductive member 32. A concave portion may be formed on the outer peripheral surface of the tubular portion 32a to hook and fix the fixing pawl portions 34f formed at the second insulating member 34.

First Modification

In place of filling the second through-hole 34e of the second insulating member 34 as in the foregoing embodiment, an insulating layer 38 may be provided at a region in the collector 16, the region facing the second through-hole 34e of the second insulating member 34, as shown in FIG. 9. Such a configuration makes sparks less likely to occur, thereby preventing the second insulating member 34 around the second through-hole from being fused and carbonized. The insulating layer 38 may be formed by applying insulating resin or affixing a tape, for example. A rubber-based material, a polyolefin material, fluoropolymer or other materials can be used as the insulating layer 38. The area of the region in which the insulating layer 38 is formed is preferably equivalent to the area of the second through-hole 34e, more preferably, larger than the second through-hole 34e.

Second Modification, Third Modification

Figure 10:
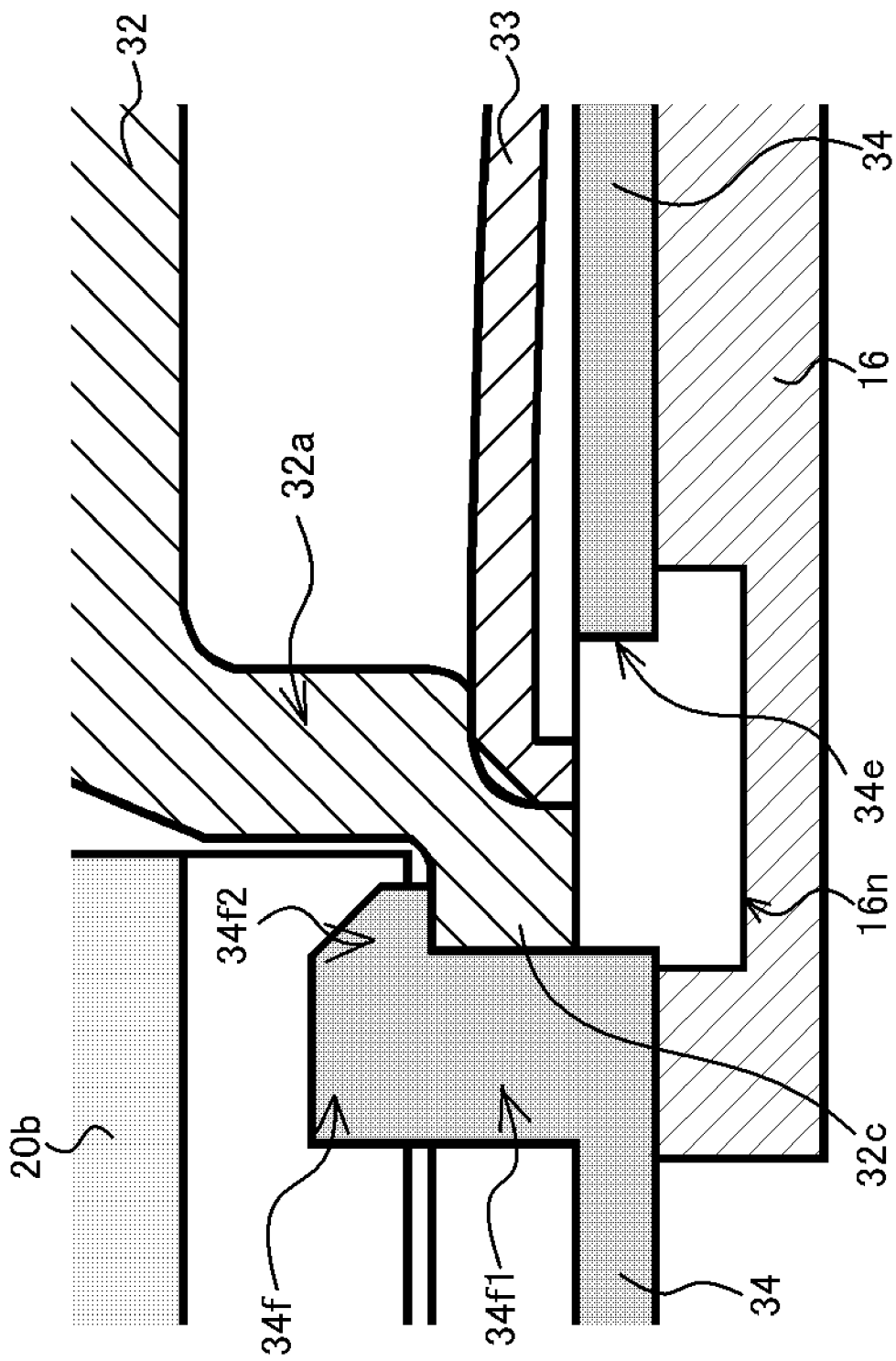
FIG. 10 is a view of a second modification, corresponding to FIG. 8.
Figure 11:
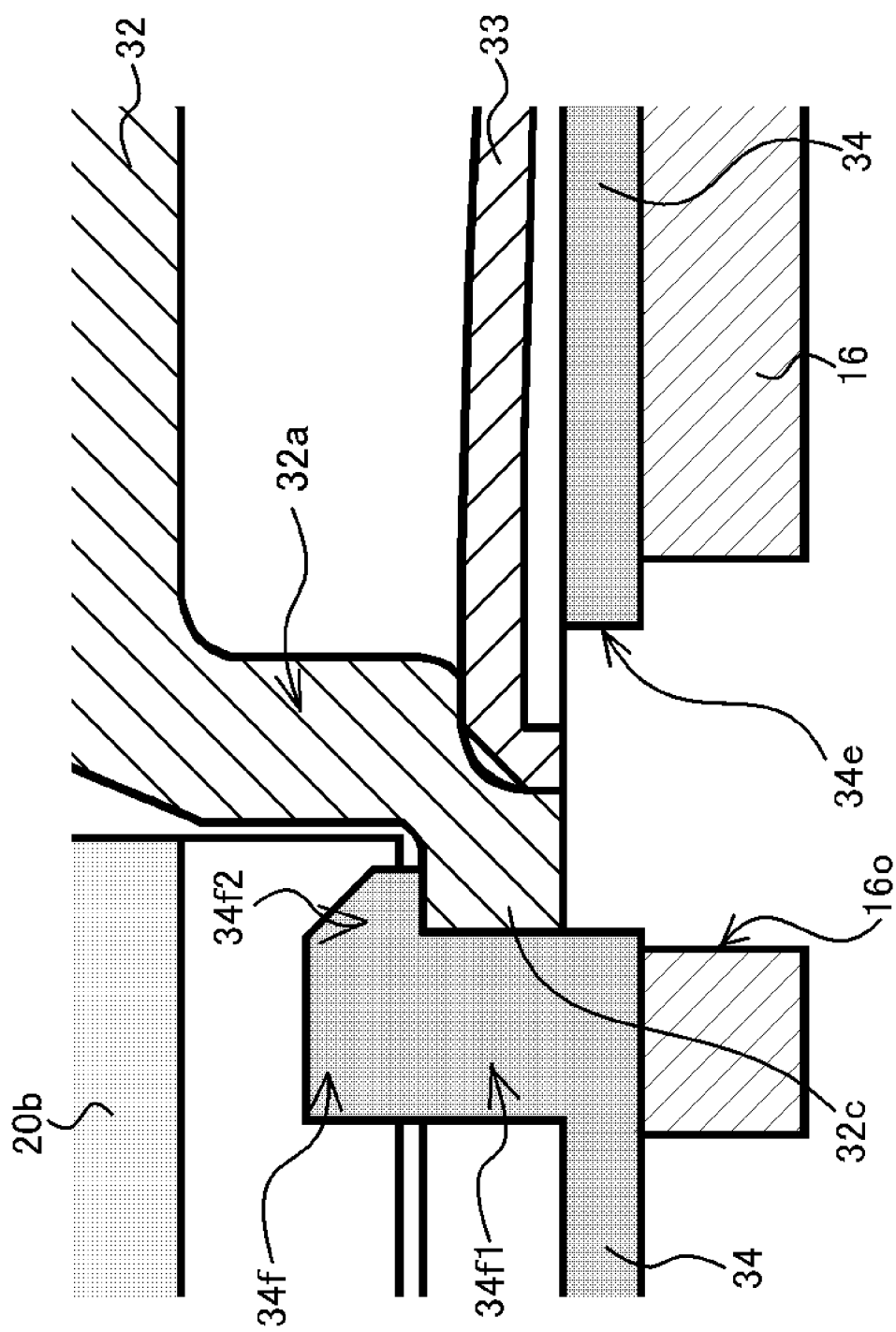
FIG. 11 is a view of a third modification, corresponding to FIG. 8.

In place of filling the second through-hole 34e of the second insulating member 34 as in the foregoing embodiment, a concave portion 16n or a through-hole 16o may be provided at a region in the collector 16, the region facing the second through-hole 34e of the second insulating member 34, as shown in FIG. 10 (a second modification) and FIG. 11 (a third modification). Such a configuration increases the distance between the second through-hole 34e and the collector 16. Therefore, sparks are less likely to occur, thereby preventing the second insulating member 34 around the second through-hole 34e from being fused and carbonized. The area of the region in which the concave portion 16n or the through-hole 16o is formed is preferably equivalent to the area of the second through-hole 34e, more preferably, larger than the second through-hole 34e.

Fourth Modification

Figure 12:
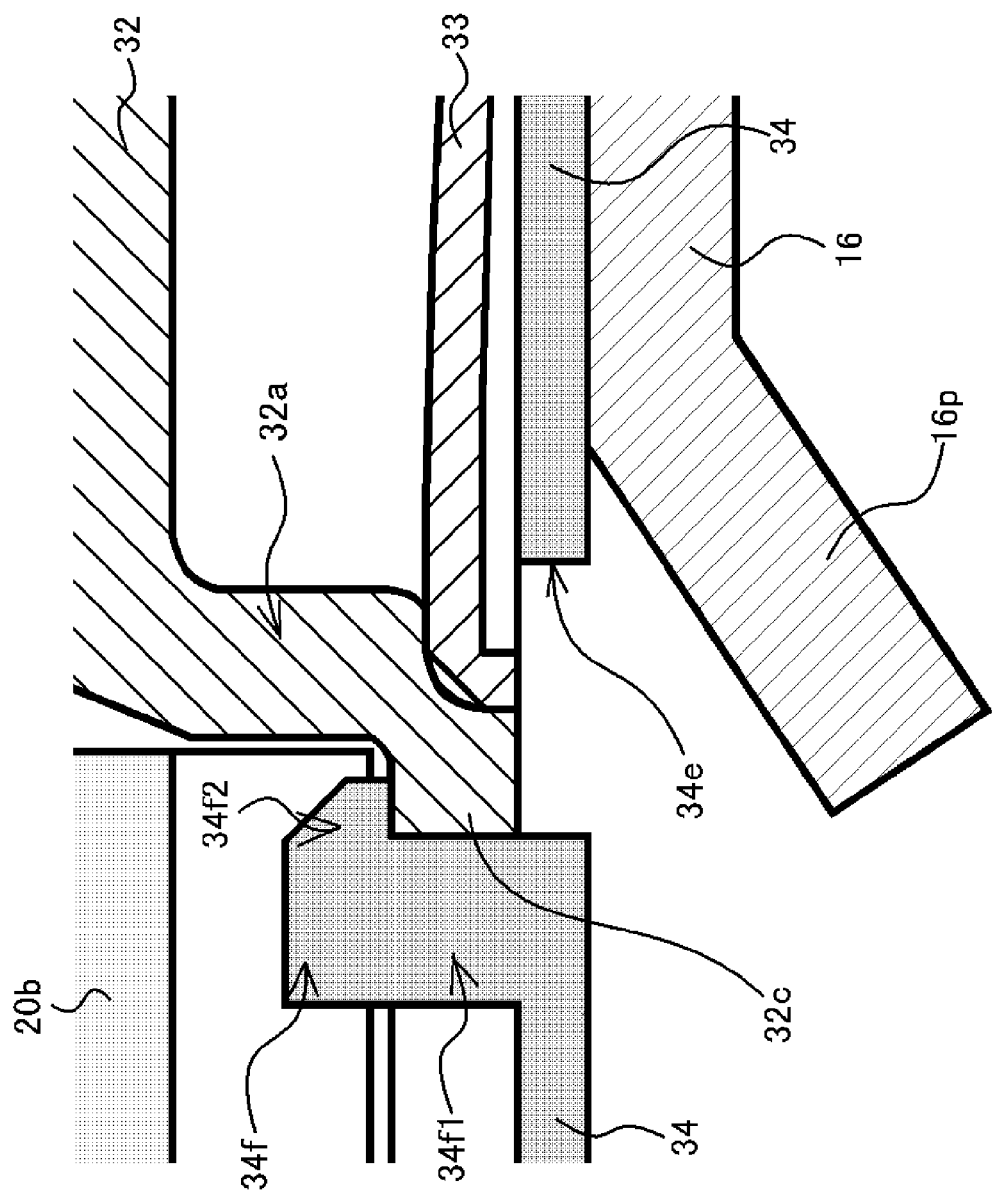
FIG. 12 is a view of a fourth modification, corresponding to FIG. 8.

In place of filling the second through-hole 34e of the second insulating member 34, the collector 16 may have a folded portion 16p formed by folding the collector 16 in a direction away from the second insulating member 34 in the vicinity of the region facing the second through-hole 34e, as shown in FIG. 12. Such a configuration increases the distance between the second through-hole 34e and the collector 16, thereby preventing sparks. Thus, the second insulating member 34 around the second through-hole 34e can be prevented from being fused and carbonized.

Fifth Embodiment

Figure 13:
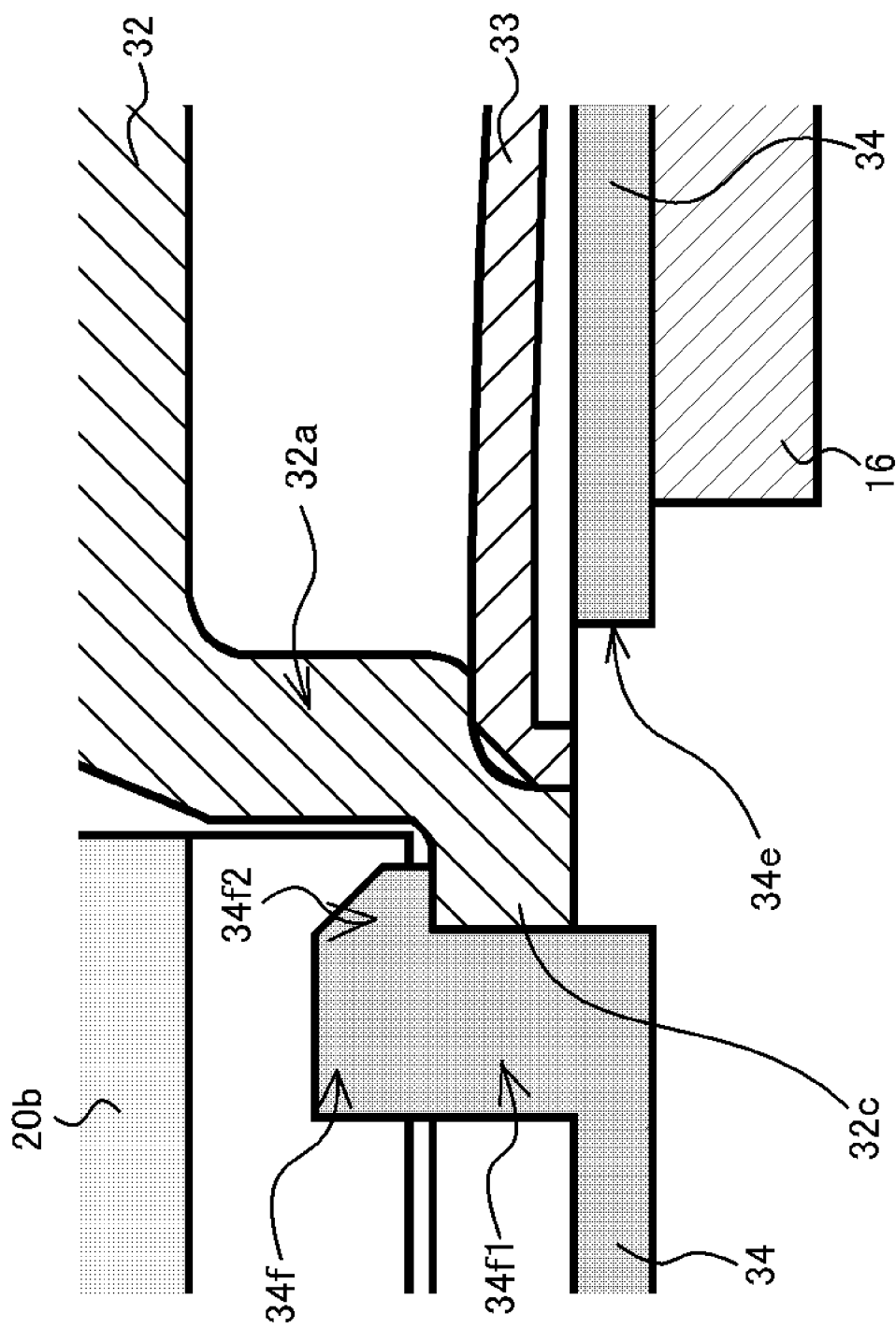
FIG. 13 is a view of a fifth modification, corresponding to FIG. 8.
Figure 15:
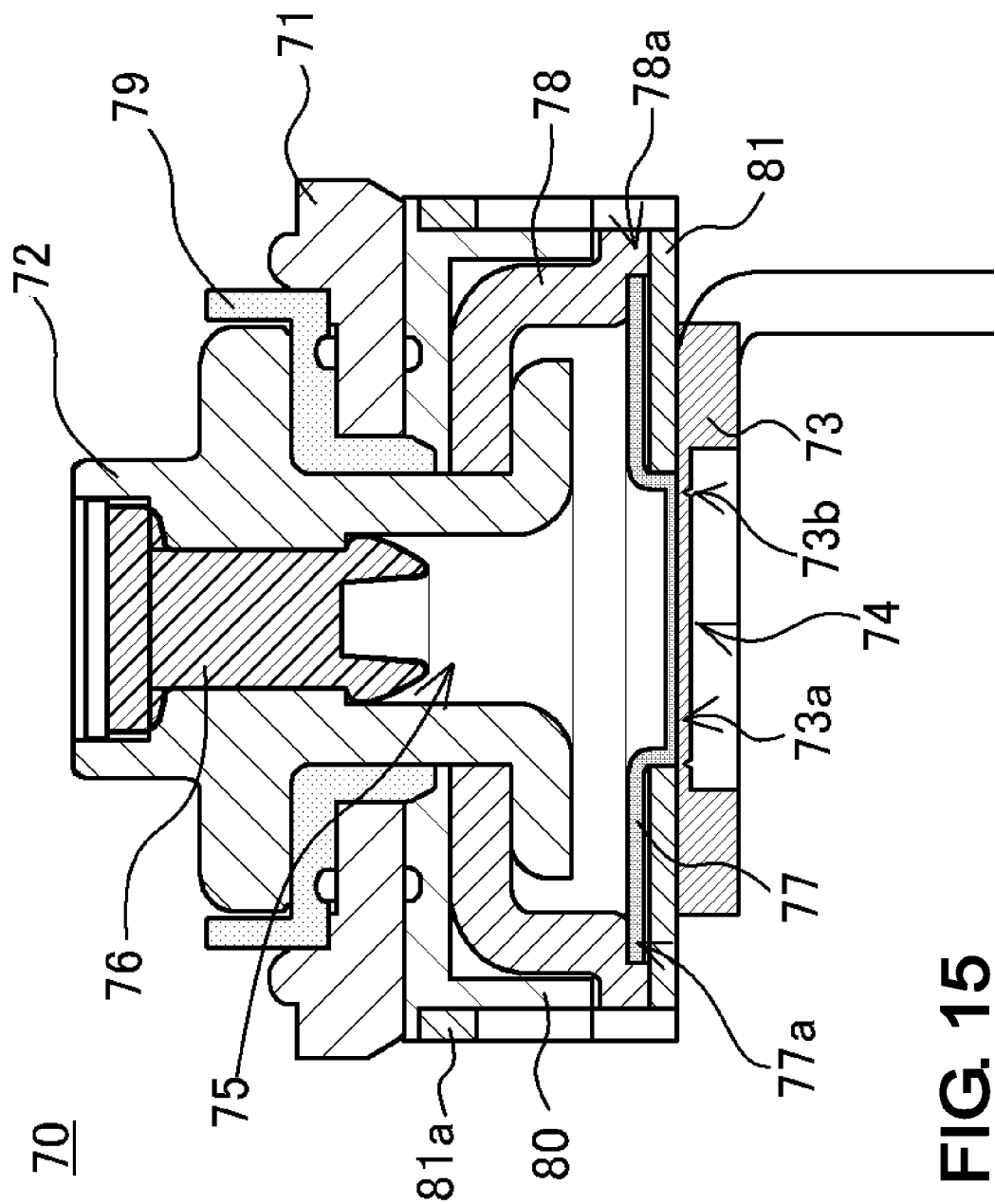
FIG. 15 is a sectional view of an external terminal in still another prismatic secondary battery of the related art.

In place of filling the second through-hole 34e of the second insulating member 34, as shown in FIG. 13, the collector 16 may be eliminated at the region facing the second through-hole 34e of the second insulating member 34. Such a configuration prevents sparks, and also prevents the second insulating member 34 around the second through-hole 34e from being fused and carbonized.

The through-hole 17b in the top part of the positive electrode external terminal 17 is used for testing whether the periphery of the inversion plate 33, which is a component of the current interruption mechanism 35, has been welded hermetically, and may be used in an unchanged state. However, if corrosive gas or liquid enters the through-hole 17b and the inversion plate 33 becomes corroded, a risk will arise that the current interruption mechanism 35 may not operate normally. Thus, it will be preferable to seal up the through-hole 17b of the positive electrode external terminal 17. In the prismatic nonaqueous electrolyte secondary battery 10 of the embodiment, the through-hole 17b formed in the positive electrode external terminal 17 has a large-diameter portion formed toward the exterior of the outer casing 12 and a small-diameter portion formed toward the interior of the outer casing 12. Taking advantage of this configuration, the through-hole 17b of the positive electrode external terminal 17 is robustly sealed by, For example, a rubber terminal plug 36 in its interior. This terminal plug 36 corresponds to the sealing member This terminal plug 36 has: at the upper end, a head portion 36a whose diameter is larger than the small-diameter portion of the through-hole 17b of the positive electrode external terminal 17 and smaller than the large-diameter portion of the through-hole 17b of the positive electrode external terminal 17; at the lower end, a projecting portion 36b whose diameter is smaller than the head portion 36a and larger than the small-diameter portion of the through-hole 17b; latching portions 36c formed in a shape that tapers off from the projecting portion 36b; and in an intermediate position, a connecting portion 36d that has a diameter roughly the same as the small-diameter portion of the through-hole 17b of the positive electrode external terminal 17 and a length substantially the same as such small-diameter portion.

The terminal plug 36 is installed into the through-hole 17b of the positive electrode external terminal 17 in such a manner that the head portion 36a is located at the large-diameter portion of the through-hole 17b, and the latching portions 36c protrude beyond the end of the small-diameter portion of the through-hole 17b. Furthermore, on the surface of the head portion 36a of the terminal plug 36, there is provided a metallic plate 37 of aluminum or other materials, to give the head portion 36a high strength even though its thickness is small. This metallic plate 37 can be weld-fixed to the positive electrode external terminal 17 by laser welding or other methods. The metallic plate 37 could potentially fall out due to vibration, etc., since it is formed of an elastic member. However, weld-fixing the metallic plate 37 to the positive electrode external terminal 17 will render the through-hole 17b more robustly sealed by the terminal plug 36.

Furthermore, in the prismatic nonaqueous electrolyte secondary battery 10 of the embodiment, the space in the current interruption mechanism 35 that corresponds to the exterior is completely sealed. But even if the pressure inside the outer casing 12 increases due to some cause, the pressure of the gases produced inside the battery will become extremely high during abnormality, and there will be no simultaneous similar increase in the pressure inside the sealed space in the current interruption mechanism 35 adjacent to the exterior of the battery. Thus, the space adjacent to the battery exterior being sealed will pose no problem for actuation of the current interruption mechanism 35.

The foregoing description of the prismatic nonaqueous electrolyte secondary battery 10 of the embodiment sets forth an example where the first region 16a of the positive electrode collector 16 has a large width, and two second regions 16b are formed in mutually opposed directions relative to the first region 16a. However, some prismatic nonaqueous electrolyte secondary batteries are small in width and have only one second region formed in the positive electrode collector. The invention can be applied equally to such narrow-width prismatic nonaqueous electrolyte secondary batteries. In such a case, if the second region 16b of a positive electrode collector 16 is placed in contact with one surface of a bunch of stacked positive electrode substrate exposed portions 14 to perform resistance welding, it will suffice to place a positive electrode collector receiving member (omitted from the drawings) formed of the same material as the positive electrode collector 16 in contact with the other surface of the positive electrode substrate exposed portions 14, and to perform the resistance welding by passing the welding current between the second region 16b of the positive electrode collector 16 and the positive electrode collector receiving member.

Furthermore, the foregoing description of the prismatic nonaqueous electrolyte secondary battery 10 of the embodiment sets forth an example where resistance welding is used as the method for connecting the positive electrode collector 16 to the positive electrode substrate exposed portions 14. However, the method is not limited to resistance welding, and may alternatively be laser welding or ultrasonic welding. It would be possible to connect the positive electrode collector 16 to the end surfaces of the tips of the positive electrode substrate exposed portions 14. Furthermore, the foregoing description of the prismatic nonaqueous electrolyte secondary battery 10 of the embodiment sets forth an example where an object of rubber that is provided with a metallic plate 37 is used as the terminal plug 36 that seals the through-hole 17b of the positive electrode external terminal 17. However, an object of plastic may be used, or alternatively the through-hole 17b may be sealed by the metallic plate 37 alone.

Although the foregoing description of the prismatic nonaqueous electrolyte secondary battery 10 of the embodiment concerned the structure on the positive electrode external terminal 17 side, this can also be employed as the structure for the negative electrode external terminal 19 side. However, if a structure is employed in which the current interruption mechanism 35 is provided on the positive electrode external terminal 17 side, there will be no need to employ a current interruption mechanism on the negative electrode external terminal 19 side, and hence it is possible to employ a simpler structure for the negative electrode external terminal 19 side.

What is claimed is:

1. A prismatic secondary battery comprising:
a prismatic outer casing having a mouth;
an electrode assembly housed in the prismatic outer casing and having a positive electrode plate and a negative electrode plate;
a positive electrode collector electrically connected to the positive electrode plate;
a negative electrode collector electrically connected to the negative electrode plate;
a sealing body sealing the mouth of the outer casing and having a through-hole;
at least one external terminal inserted in the through-hole of the sealing body while being electrically insulated from the sealing body with a first insulating member interposed therebetween;

a conductive member having a tubular portion;
an inversion plate containing a conductive material that is deformed when the pressure inside the battery exceeds a particular level; and
a second insulating member having a first through-hole formed between the inversion plate and at least one of the positive electrode collector and the negative electrode collector,
at least one of the positive electrode collector and the negative electrode collector being electrically connected to the inversion plate through the first through-hole formed in the second insulating member,
the tubular portion of the conductive member having one end portion electrically connected to the external terminal and the other end portion sealed with the inversion plate,
the second insulating member having a plurality of fixing pawl portions, the fixing pawl portions being hooked and fixed to a fixing portion formed on the outer surface side of the conductive member;
wherein, in a planar view:
the conductive member has a circular shape, the first through-hole being centered in the circular shape;
the second insulating member has a rectangular shape surrounding the conductive member having a circular shape, the rectangular shape of the second insulating member having an outer edge; and
the fixing pawl portions are located at a distance from the outer edge of the rectangular shape of the second insulating member toward the first through-hole.

2. The prismatic secondary battery according to claim 1, wherein the fixing portion formed on the outer surface side of the tubular portion of the conductive member is a flange portion or a concave portion.

3. The prismatic secondary battery according to claim 1, wherein the second insulating member further has a joint portion with the first insulating member.

4. The prismatic secondary battery according to claim 1, wherein:
the second insulating member contains a resin material;
each of the fixing pawl portions has a first region extending vertically to the main body of the second insulating member and a second region formed on the first region and protruded from the first region toward the conductive member;
the main body of the second insulating member has a second through-hole formed at the base of the first region on a side to which the second region protrudes; and
the second through-hole is closed with an insulating member.

5. The prismatic secondary battery according to claim 1, wherein:
the second insulating member contains a resin material;
each of the fixing pawl portions has a first region extending vertically to the main body of the second insulating member and a second region formed on the first region and protruded from the first region toward the conductive member;
the main body of the second insulating member has a second through-hole formed at the base of the first region on a side to which the second region protrudes; and
at least one of the positive electrode collector and the negative electrode collector connected to the inversion plate includes an insulating layer in a region facing the second through-hole.

6. The prismatic secondary battery according to claim 1, wherein:
the second insulating member contains a resin material;
each of the fixing pawl portions has a first region extending vertically to the main body of the second insulating member and a second region formed on the first region and protruded from the first region toward the conductive member;
the main body of the second insulating member has a second through-hole formed at the base of the first region on a side to which the second region protrudes; and
at least one of the positive electrode collector and the negative electrode collector connected to the inversion plate has a concave portion or a through-hole in a region facing the second through-hole.

7. The prismatic secondary battery according to claim 1, wherein:
the second insulating member contains a resin material;
each of the fixing pawl portions has a first region extending vertically to the main body of the second insulating member and a second region formed on the first region and protruded from the first region toward the conductive member;
the main body of the second insulating member has a second through-hole formed at the base of the first region on a side to which the second region protrudes; and
at least one of the positive electrode collector and the negative electrode collector connected to the inversion plate is folded in the vicinity of a region facing the second through-hole in a direction away from the second insulating member.

8. The prismatic secondary battery according to claim 1, wherein:
the second insulating member contains a resin material;
each of the fixing pawl portions has a first region extending vertically to the main body of the second insulating member and a second region formed on the first region and protruded from the first region toward the conductive member;
the main body of the second insulating member has a second through-hole formed at the base of the first region on a side to which the second region protrudes; and
at least one of the positive electrode collector and the negative electrode collector connected to the inversion plate is not present in a region facing the second through-hole.

9. The prismatic secondary battery according to claim 1, wherein:
at least one of the positive electrode collector and the negative electrode collector comprises a collector member,
at least one opening or notch is formed at a portion of the collector member that faces the second insulating member;
a projection having an increased-diameter portion having a diameter larger than other portions at the top of the projection is formed at a portion of the second insulating member that faces the at least one opening or notch formed in the collector member; and
the at least one opening or notch formed in the collector member is engaged with the projection formed in the second insulating member.

10. The prismatic secondary battery according to claim 9, wherein the collector member is formed by folding a piece of plate material.

11. The prismatic secondary battery according to claim 9, wherein the collector member contains a conductive material having rigidity.

12. The prismatic secondary battery according to claim 1, wherein at least one of a thin portion and a groove is formed at the periphery of a portion of at least one of the positive electrode collector and the negative electrode collector connected to the inversion plate.

13. The prismatic secondary battery according to claim 1, wherein a through-hole is formed in the external terminal so as to bring the outside of the battery into communication with the space on the inner surface side of the tubular portion of the conductive member, and the through-hole in the external terminal is sealed with a sealing member.

14. The prismatic secondary battery according to claim 1, wherein the electrode assembly is a flattened electrode assembly that has a plurality of stacked positive electrode exposed portions at one end and a plurality of stacked negative electrode exposed portions at the other end, with the positive electrode exposed portions being disposed so as to oppose one sidewall of the prismatic outer casing and the negative electrode exposed portions being disposed so as to oppose the other sidewall of the prismatic outer casing, and with the positive electrode collector being connected to the positive electrode exposed portions and the negative electrode collector being connected to the negative electrode exposed portions.

* * * * *